United States Patent
Chernyak et al.

(10) Patent No.: US 12,425,593 B2
(45) Date of Patent: Sep. 23, 2025

(54) APPARATUS AND METHOD FOR INVERSE QUANTIZATION

(71) Applicant: Huawei Technologies Co., Ltd., Guangdong (CN)

(72) Inventors: Roman Igorevich Chernyak, Munich (DE); Alexander Alexandrovich Karabutov, Munich (DE); Sergey Yurievich Ikonin, Moscow (RU); Timofey Mikhailovich Solovyev, Munich (DE); Haitao Yang, Shenzhen (CN); Jianle Chen, San Diego, CA (US); Yin Zhao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 209 days.

(21) Appl. No.: 18/195,007

(22) Filed: May 9, 2023

(65) Prior Publication Data

US 2023/0291902 A1  Sep. 14, 2023

Related U.S. Application Data

(63) Continuation of application No. 17/249,946, filed on Mar. 19, 2021, now Pat. No. 11,689,723, which is a
(Continued)

(51) Int. Cl.
*H04N 19/105* (2014.01)
*H04N 19/124* (2014.01)
(Continued)

(52) U.S. Cl.
CPC ......... *H04N 19/124* (2014.11); *H04N 19/105* (2014.11); *H04N 19/132* (2014.11);
(Continued)

(58) Field of Classification Search
CPC .. H04N 19/124; H04N 19/105; H04N 19/132; H04N 19/176; H04N 19/186; H04N 19/46
See application file for complete search history.

(56) References Cited

U.S. PATENT DOCUMENTS

| | | | |
|---|---|---|---|
| 2013/0259141 A1 | 10/2013 | Van Der Auwera et al. | |
| 2015/0016720 A1 | 1/2015 | Vermeir | |

(Continued)

FOREIGN PATENT DOCUMENTS

| | | |
|---|---|---|
| CN | 104205836 A | 12/2014 |
| CN | 104427339 A | 3/2015 |

(Continued)

OTHER PUBLICATIONS

Zhao Liping et al., A multi-chroma format cascaded coding method for full-chroma image in AVS2, Telecommunications Science, 2018, Issue 04, 11 pages.
(Continued)

*Primary Examiner* — Samuel D Fereja
(74) *Attorney, Agent, or Firm* — WOMBLE BOND DICKINSON (US) LLP

(57) ABSTRACT

A method for inverse quantization of a current block of a picture is provided. The method is performed by a decoder, and the picture comprises a luminance component and a chrominance component, where the luminance component and the chrominance component are partitioned into multiple blocks. The method includes obtaining one or more existing quantization parameter (QP) values from a received bitstream, wherein the one or more existing QP values are associated with a current block in the chrominance component; determining a QP value for the current block in the chrominance component based on the one or more existing QP values; performing inverse quantization on the current
(Continued)

block in the chrominance component using the determined QP value.

14 Claims, 11 Drawing Sheets

Related U.S. Application Data continuation of application No. PCT/CN2019/107134, filed on Sep. 21, 2019.

(60) Provisional application No. 62/745,983, filed on Oct. 15, 2018, provisional application No. 62/744,125, filed on Oct. 10, 2018, provisional application No. 62/734,982, filed on Sep. 21, 2018.

(51) Int. Cl.
  *H04N 19/132* (2014.01)
  *H04N 19/176* (2014.01)
  *H04N 19/186* (2014.01)
  *H04N 19/46* (2014.01)

(52) U.S. Cl.
  CPC ......... *H04N 19/176* (2014.11); *H04N 19/186* (2014.11); *H04N 19/46* (2014.11)

(56) References Cited

U.S. PATENT DOCUMENTS

| | | | |
|---|---|---|---|
| 2015/0172652 A1 | 6/2015 | Gamei et al. | |
| 2016/0100168 A1* | 4/2016 | Rapaka | H04N 19/12 375/240.03 |
| 2018/0020241 A1* | 1/2018 | Li | H04N 19/18 |

FOREIGN PATENT DOCUMENTS

| | | |
|---|---|---|
| CN | 104584559 A | 4/2015 |
| CN | 105359521 A | 2/2016 |
| CN | 107211130 A | 9/2017 |
| CN | 107431795 A | 12/2017 |
| CN | 107836116 A | 3/2018 |
| CN | 108293124 A | 7/2018 |
| CN | 115052142 A | 9/2022 |
| EP | 2506579 A2 | 10/2012 |
| KR | 20170013274 A | 2/2017 |
| KR | 20180014655 A | 2/2018 |
| WO | 2014161741 A1 | 10/2014 |
| WO | 2015187978 A1 | 12/2015 |
| WO | 2016011796 A1 | 1/2016 |
| WO | 2017219342 A1 | 12/2017 |
| WO | 2018013706 A1 | 1/2018 |
| WO | 2018066849 A1 | 4/2018 |

OTHER PUBLICATIONS

Sony Electronics Inc., et al., Chroma QP extension and signalling enhancement, JCTVC-10265r1, Joint Collaborative Team on Video Coding (JCT-VC) of ITU-T SG 16 WP 3 and ISO/IEC JTC 1/SC 29/WG11, 9th Meeting: Geneva, CH, Apr. 27 May 7, 2012, 11 pages.

Canon, On the derivation of chroma QPs, JCTVC-K0188, Joint Collaborative Team on Video Coding (JCT-VC) of ITU-T SG 16 WP 3 and ISO/IECJTC 1/SC 29/WG11, 11th Meeting: Shanghai, CN, 10 Oct. 19, 2012, 12 pages.

Qualcomm et al, Proposed editorial improvements to HEVC Screen Context Coding Draft Text 4 Fixes in Annex F and G, ISO/IEC 23008-2:2015(E), JCTVC-V0031 fixes annexes F G v1, Joint Collaborative Team on Video Coding (JCT-VC)of ITU-T SG 16 WP 3 and ISO/IEC JTC 1/SC 29/WG11, 22nd Meeting: Geneva, CH, 15 Oct. 21, 2015, 661 pages.

Shih-Ta Hsiang et al., CE7.3.2: Extension of quantization parameter value range , Joint Video Experts Team (JVET), Jul. 16, 2018, [JVET-K0251-v2] (version 3), 9 pages.

Recommendation ITU-T H.265 (Apr. 2013) , pp. 68-69.

* cited by examiner

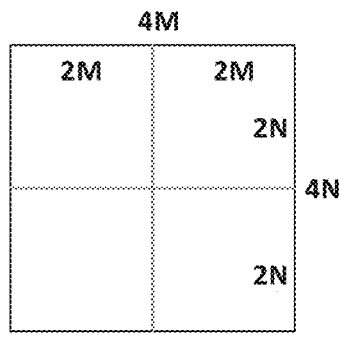
*Fig. 6A*
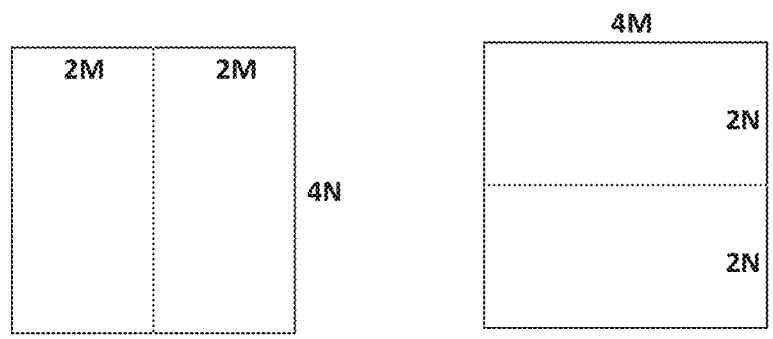
*Fig. 6B*                     *Fig. 6C*
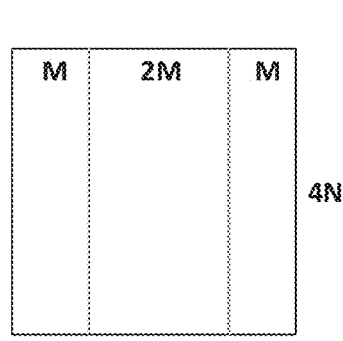          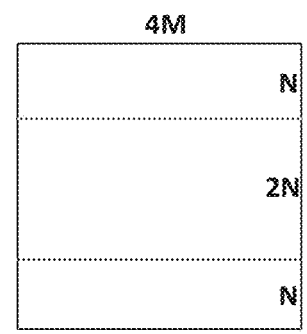
*Fig. 6D*                     *Fig. 6E*

X Location of luma sample
O Location of chroma sample

X Location of luma sample
O Location of chroma sample

APPARATUS AND METHOD FOR INVERSE QUANTIZATION

CROSS-REFERENCE TO RELATED APPLICATIONS

This application is a continuation of U.S. application Ser. No. 17/249,946, filed on Mar. 19, 2021, which is a continuation of International Application No. PCT/CN2019/107134, filed on Sep. 21, 2019, which claims the benefit of U.S. Provisional Application No. 62/734,982, filed on Sep. 21, 2018 and U.S. Provisional Application No. 62/744,125, filed on Oct. 10, 2018 and U.S. Provisional Application No. 62/745,983, filed on Oct. 15, 2018. All of the afore-mentioned patent applications are hereby incorporated by reference in their entireties.

TECHNICAL FIELD

The present disclosure relates to the technical field of image and/or video decoding, and in particular to apparatus and method for inverse quantization.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

Video compression techniques such as inter prediction, intra prediction and loop filters have demonstrated to be effective and thus adopted into various video coding standards, such as H.264/AVC and H.265/HEVC.

Basic processing unit of video compression is usually called macroblock which is a part of picture having size e.g. 16×16 or 64×64 pixels. In the latest video coding standard H.265/HEVC so-called Coding Tree Unit (CTU) is used as a basic processing unit. CTU is also referred to as largest coding unit (LCU). In H.265/HEVC CTUs consist of one Luma CTB and two Chroma CTBs correspondently represent luminance and chrominance video signal parts, e.g. Y, Cb, Cr components. CTUs are processed one by one in scan order from top-left to bottom-right corner of the picture. Each CTU may be further divided on smaller coding units (CU) by using e.g. quad-tree split. Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference sample to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as DBF, SAO and ALF try to suppress. The use of sophisticated prediction coding (such as motion compensation and intra-prediction) and partitioning techniques (e.g., QT for CUs and PUs as well as RQT for TUs in the HEVC/H.265 standard and multiple tree (MT) for the VVC reference software starting from version BMS-1.0 and VTM-1.0) allow to significantly reduce the redundancy in PUs. The fundamental difference between QT and MT partitioning mechanisms is the latter one also allows rectangular blocks by using binary and triple trees-based partitioning as well as square blocks by using quad tree approach. As the video creation and use have become more and more ubiquitous, video traffic is the biggest load on communication networks and driver for increasing data storage demands. Accordingly, one of the goals of most of the video coding standards is to lower coding complexity compared to its predecessor without sacrificing picture quality.

SUMMARY

Embodiments of the present application provide apparatuses and methods for encoding and decoding according to the independent claims.

The foregoing and other objects are achieved by the subject matter of the independent claims. Further embodiments are apparent from the dependent claims, the description and the figures.

Particular embodiments are outlined in the attached independent claims, with other embodiments in the dependent claims.

Apparatus and method for boundary partition are disclosed. The apparatus and method use a particular boundary partition processing for decreasing the coding complexity. Boundary partition processing is also referred to as a picture or image boundary handling.

According to a first aspect, a method for inverse quantization of a current block of a picture is provided. The picture comprises a luminance component and a chrominance component, the luminance component and the chrominance component are partitioned into multiple blocks (e.g. coding unit, CU) by separate partition trees. The method includes that a decoder obtains one or more existing quantization parameter (QP) values from a (e.g. received) bitstream, wherein the one or more existing QP values relate to a current block (i.e. the block being processed) in the chrominance component, and determines a QP value for the current block in the chrominance component based on the one or more existing QP values, and performs inverse quantization on the current block in the chrominance component by using the determined QP value.

A video image may be divided into luminance (or luma) component and chrominance (or chroma) component. The luminance or luma component represents the brightness in the image (the "black-and-white" or achromatic portion of the image), and chrominance or chroma component(s) represent color information of the image. Just as an example, when a picture or an image is denoted in the color space of [Y, Cb, and Cr], the Y component is the luminance (or luma) component, and the Cb and Cr components are the chrominance or chroma component(s).

The luminance component and the chrominance component are partitioned into multiple blocks by separate partition trees. In other words, the luminance component and the chrominance component are partitioned separately. It is known that there are different partition trees, for example, quad-tree (QT), binary tree (BT), ternary tree (TT), and any combination of the above partition trees, for example, Quad-tree plus binary tree (QTBT), or Quad-tree plus binary tree or ternary tree (QT-BT/TT), etc.

The expression "one or more existing QP values relate to a current block in the chrominance component" correspond to the existing QP values which are related to the current block in the chrominance component. Just for example, the existing QP value comprises: a QP value of a collocated block in the luminance component; one or more neighboring blocks of the collocated block in the luminance component; and one or more neighboring blocks of the current block in the chrominance component.

The bitstream may be a received bitstream, which herein means a bitstream received at the decoder for processing. The reception here relates to any kind or reception, e.g. from a storage or from a network or the like.

For a block in a chrominance component of the picture, a quantization parameter of the block in the chrominance component may be determined by one or more existing quantization parameter, QP values obtained from a received bitstream. This provides an efficient way to determine quantization parameter for the block in the chrominance component, and alleviates processing overload of the decoder to determine quantization parameter for each block in the chrominance component.

According to an embodiment, the one or more existing QP values comprises at least one of the following: a QP value of a collocated block in the luminance component; existing QP values of one or more neighboring blocks of the collocated block in the luminance component; and existing QP values of one or more neighboring blocks of the current block in the chrominance component.

This defines the existing QP values, and provides an efficient way for determining the QP value of the block in the chrominance component of the picture.

According to another embodiment, the method further comprises: determining the QP value for the current block in the chrominance component based on the QP value of the collocated block in the luminance component.

The term "the collocated block in the luminance component" is a block in the luminance component which is collocated to the block in the chrominance component, here, the term "collocated" means mapping relation between the luminance and the chrominance components of a picture.

This example provides an easy way to determine the QP value of a block in the chrominance component. Because the luminance component and the chrominance component of a picture has relation, so it is an easy and direct way to regard the QP value of the collocated block in the luminance component as the QP value of the block in the chrominance component.

The operation of determining the QP value for the current block in the chrominance component based on the QP value of the collocated block in the luminance component, comprises, according to any of the previous examples and the first aspect: determining a luminance block collocated with a sample in a specific position in the current chrominance block; retrieving QP value (e.g. QpY_basic) of the determined luminance block; determining QP values for the current block in the chrominance component based on the QP value (e. g., QpY_basic) of the determined luminance block.

Determining a collocated block according to a specific sample enables reliable and unambiguous, as well as not complex implementation even in cases in which the luma blocks and the chroma blocks are allowed to have different partitions.

In an example, the sample in the specific position is a top-left sample in the bottom right quarter of the current chrominance block.

Such specific position roughly corresponds to a center of the block and thus provides for an appropriate estimation of the QP of the collocated block.

Alternatively or in addition, the QP values for the current block in the chrominance component is determined according to following formulas or new formulas derived from the following formulas: Qp'Cb=QpCb+QpBdOffsetC+delta_qp_c, Qp'Cr=QpCr+QpBdOffsetC+delta_qp_c, wherein QpCb and QpCr are obtained from qPiCb and qPiCr parameters obtained based on the QP value of the determined luminance block by applying a chroma QP mapping function. In particular, in some specific examples, qPiCb and qPiCr are indexes in the chroma mapping function (table), which are calculated based on QpY_basic. QpY_basic correspond to the QP value of the determined luminance block.

According to an embodiment, the method is applied separately for Luma and Chroma plane based on two picture parameter set, PPS-based control flags; if a first control flag is equal to true, the method is applied for luma QP derivation; or if the first control flag is equal to false, the method is not applied for luma QP derivation; and/or, if a second control flag is equal to true, the method is applied for chroma QP derivation; or if the second control flag is equal to false, the method is not applied for chroma QP derivation.

This facilitates provision of an efficient and scalable syntax for the bitstream.

According to an embodiment, the method further comprising: determining the QP value for the current block in the chrominance component based on the one or more existing QP values and at least one of the following: a chrominance delta QP value signaled in the received bitstream, or a chrominance QP offset value signaled in the received bitstream.

According to an embodiment, the method further comprising: obtaining a partition depth value of the current block, and determining the QP value for the current block in the chrominance component based on the one or more existing QP values and a chrominance delta QP value signaled in the received bitstream, if the partition depth value is below a threshold.

In this way, it is not needed to apply this way to the block with a depth value which is above the threshold, so this reduce the complexity of computation.

According to an embodiment, the threshold is determined based on a pre-defined number, or a number signaled in a parameter set.

For example, this number may be pre-defined by programmer, or may be signaled in a parameter set, for example, picture parameter set (PPS) or sequence parameter set (SPS).

According to an embodiment, the luminance component and the chrominance component are partitioned into multiple blocks (e.g. coding unit, CU) by separate partition trees.

It is noted that a harmonized method for inverse quantization is provided, this method does not only apply to a single partition (ST) mode (i.e. Luma and Chroma component(s) are partitioned by a single partition), but also apply to a dual partition (DT) mode (i.e. Luma and Chroma component(s) are partitioned independently by separate partition trees).

According an embodiment, a decoding apparatus is provided comprising processing circuitry for carrying out the method of the first aspect and any one of the examples of the first aspect.

According to a second aspect, a method is provided for quantization of a current block of a picture, wherein the method is performed by an encoder, and the picture comprises a luminance component and a chrominance component, the luminance component and/or the chrominance component are partitioned into multiple blocks, and the method comprising: performing quantization on the current block in a chrominance component by using a determined QP value; obtaining one or more existing quantization parameter, QP values and including the one or more existing QP into a bitstream, wherein the one or more existing QP values relate to the current block in the chrominance component; determining a QP parameter for the current block in the chrominance component based on the one or more existing QP values and on said determined QP value; and including the QP parameter into the bitstream.

According to an embodiment, the one or more existing QP values comprises at least one of the following: a QP value of a collocated block in the luminance component; existing QP values of one or more neighboring blocks of the collocated block in the luminance component; and existing QP values of one or more neighboring blocks of the current block in the chrominance component.

According to another embodiment, the determining of the QP parameter comprising determining the QP parameter for the current block in the chrominance component based on the QP value of the collocated block in the luminance component.

The operation of determining the QP parameter for the current block in the chrominance component based on the QP value of the collocated block in the luminance component comprises, according to any of the previous examples and the first aspect: retrieving QP value of a luminance block collocated with a sample in a specific position in the current chrominance block; and determining QP values for the current block in the chrominance component based on the QP value of the determined luminance block. As an example, the operation of determining the QP parameter for the current block in the chrominance component based on the QP value of the collocated block in the luminance component comprises: determining a luminance block collocated with a sample in a specific position in the current chrominance block; retrieving QP value (for example, QpY_basic) of the determined luminance block; determining QP parameter for the current block in the chrominance component based on the QP value (for example, QpY_basic) of the determined luminance block.

In an embodiment, the sample in the specific position is a top-left sample in the bottom right quarter of the current chrominance block.

Alternatively or in addition, the QP values for the current block in the chrominance component is determined according to following formulas or new formulas derived from the following formulas: Qp'Cb=QpCb+QpBdOffsetC+delta_qp_c, Qp'Cr=QpCr+QpBdOffsetC+delta_qp_c, wherein QpCb and QpCr are obtained from qPiCb and qPiCr parameters obtained based on the QP value of the determined luminance block by applying a chroma QP mapping function.

According to an embodiment, the method is applied separately for Luma and Chroma plane based on two picture parameter set, PPS-based control flags; if a first control flag is equal to true, the method is applied for luma QP derivation; or if the first control flag is equal to false, the method is not applied for luma QP derivation; and/or, if a second control flag is equal to true, the method is applied for chroma QP derivation; or if the second control flag is equal to false, the method is not applied for chroma QP derivation, wherein the method further comprises a operation of including the first flag and/or the second flag into the bitstream.

According to an embodiment, the method further comprising: determining the QP parameter for the current block in the chrominance component based on the one or more existing QP values and at least one of the following: a chrominance delta QP value signaled in the received bitstream, or a chrominance QP offset value signaled in the received bitstream. The method may further include inserting the delta QP or the QP offset into the bitstream.

According to an embodiment, the method further comprising: determining (and possibly including in the bitstream in an embodiment) a partition depth value of the current block, and determining the QP parameter for the current block in the chrominance component based on the one or more existing QP values and a chrominance delta QP value included into the bitstream, if the partition depth value is below a threshold.

According to an embodiment, the threshold is determined based on a pre-defined number, or a number signaled in a parameter set.

For example, this number may be pre-defined by programmer, or may be signaled in a parameter set, for example, picture parameter set (PPS) or sequence parameter set (SPS).

According to an embodiment, the luminance component and the chrominance component are partitioned into multiple blocks (e.g. coding unit, CU) by separate partition trees.

According a third aspect, a computer program product is provided comprising a program code for performing the method of the first aspect and any one of the examples of the first aspect, when the computer program runs on a computing device. The computer program may be stored on a non-transitory medium.

According a fourth aspect, a decoding apparatus for boundary partition of a current block of a picture is provided. The decoding apparatus includes: one or more processors; and a non-transitory computer-readable storage medium coupled to the processors and storing programming for execution by the processors, wherein the programming, when executed by the processors, configures the decoder to carry out the method of the first aspect and any one of the examples of the first aspect.

According to a fifth aspect, an encoding apparatus is provided for boundary partition of a current block of a picture, comprising: one or more processors; and a non-transitory computer-readable storage medium coupled to the processors and storing programming for execution by the processors, wherein the programming, when executed by the processors, configures the encoder to carry out the method of the second aspect and any one of the examples of the second aspect.

According to a sixth aspect, an apparatus is provided for inverse quantization of a current block of a picture, wherein the picture comprises a luminance component and a chrominance component, the luminance component and/or the chrominance component are partitioned into multiple blocks, and the apparatus comprising: a bitstream parser (1110) for obtaining one or more existing quantization parameter, QP values from a bitstream, wherein the one or more existing QP values relate to a current block in the chrominance component; a QP determination unit (1120) for determining a QP value for the current block in the chrominance component based on the one or more existing QP values; an inverse quantizer (1130) for performing inverse quantization on the current block in the chrominance component by using the determined QP value.

According to a seventh aspect, an apparatus is provided for quantization of a current block of a picture, wherein the picture comprises a luminance component and a chrominance component, the luminance component and/or the chrominance component are partitioned into multiple blocks, and the apparatus comprises: a quantizer (1210) for performing quantization on the current block in the chrominance component by using a determined QP value; a fetching unit (1220) for obtaining one or more existing quantization parameter, QP values and including the one or more existing QP into a bitstream, wherein the one or more existing QP values relate to a current block in the chrominance component; a QP determination unit (1230) for determining a QP parameter for the current block in the chrominance component based on the one or more existing QP values and on said determined QP value; and a bitstream generation unit (1240) for including the QP parameter into the bitstream.

According to an eighth embodiment, an integrated circuit is provided embodying ay of the above mentioned apparatuses.

Embodiments of the second, third and fourth aspect correspond to the respective embodiments of the first aspect. Hence, an embodiment of the method comprises the feature(s) of the corresponding embodiment of the decoding apparatus and vice versa. The decoding apparatus may be implemented as a chipset for decoding an encoded video bitstream.

In various embodiments, the advantages of the methods according to the first aspect are the same as those for the corresponding embodiments of the decoding apparatus according to the second aspect and the fourth aspect.

BRIEF DESCRIPTION OF THE DRAWINGS

The following embodiments are described in more detail with reference to the attached figures and drawings, in which:

FIG. 6A is a schematic diagram illustrating a quad-tree (QT) split according to an embodiment.

FIG. 6B is a schematic diagram illustrating a binary tree (BT) split in vertical orientation according to an embodiment.

FIG. 6C is a schematic diagram illustrating a binary tree (BT) split in horizontal orientation according to an embodiment.

FIG. 6D is a schematic diagram illustrating a ternary tree (TT) split in vertical orientation according to an embodiment.

FIG. 6E is a schematic diagram illustrating a ternary tree (TT) split in horizontal orientation according to an embodiment.

Figure 1A:
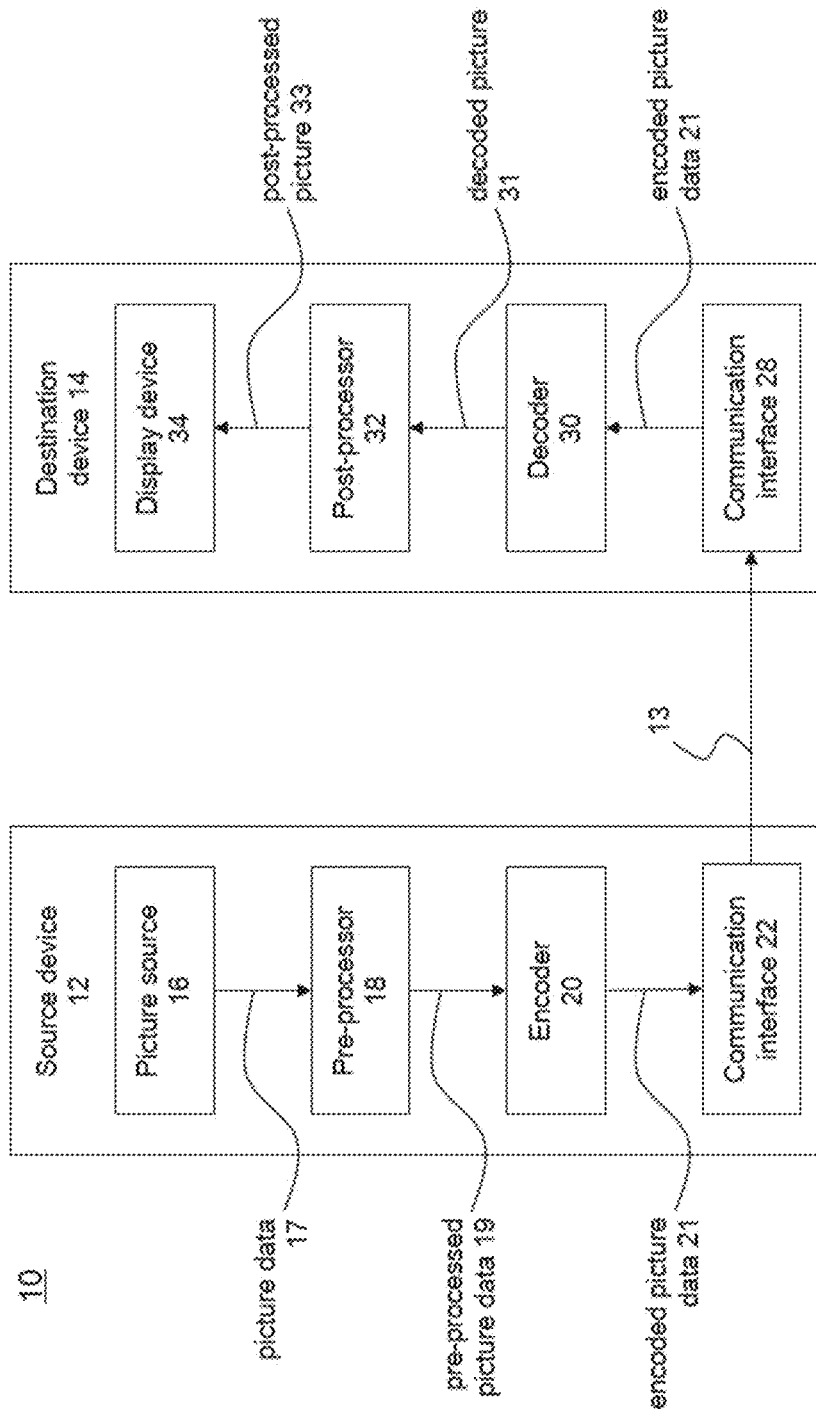
FIG. 1A is a block diagram showing an example of a video coding system according to an embodiment.

In the following identical reference signs refer to identical or at least functionally equivalent features if not explicitly specified otherwise.

DETAILED DESCRIPTION OF EMBODIMENTS

In the following description, reference is made to the accompanying figures, which form part of the disclosure, and which show, by way of illustration, specific aspects of embodiments of the application or specific aspects in which embodiments of the present application may be used. It is understood that embodiments of the application may be used in other aspects and comprise structural or logical changes not depicted in the figures. The following detailed description, therefore, is not to be taken in a limiting sense, and the scope of the present application is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding used in the present application (or present disclosure) indicates either video encoding or video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to either "encoding" or "decoding" for video sequence. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the application are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the application are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU. In the newest development of the video compression technical, Quad-tree and binary tree (QTBT) partitioning frame is used to partition a coding block. In the QTBT block structure, a CU can have either a square or rectangular shape. For example, a coding tree unit (CTU) is first partitioned by a quad-tree structure. The quad-tree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

In the following embodiments of an encoder 20, a decoder 30 and a coding system 10 are described based on FIGS. 1 to 3.

FIG. 1A is a conceptional or schematic block diagram illustrating an example coding system 10, e.g. a video coding system 10 that may utilize techniques of this present application (present disclosure). Encoder 20 (e.g. Video encoder 20) and decoder 30 (e.g. video decoder 30) of video coding system 10 represent examples of devices that may be configured to perform techniques in accordance with various examples described in the present application. As shown in FIG. 1A, the coding system 10 comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

In monochrome sampling there is only one sample array, which is nominally considered the luma array.

Figure 7A:
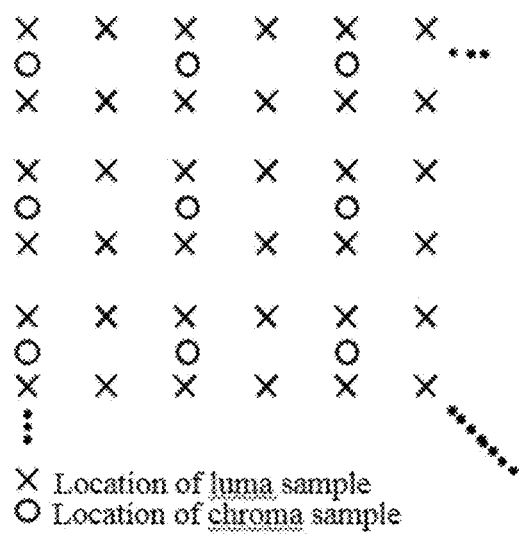
FIG. 7A is a schematic diagram illustrating a nominal vertical and a horizontal locations of 4:2:0 luma and chroma sample in a picture.

In 4:2:0 sampling, as shown in FIG. 7A, each of the two chroma arrays has half the height and half the width of the luma array.

Figure 7B:
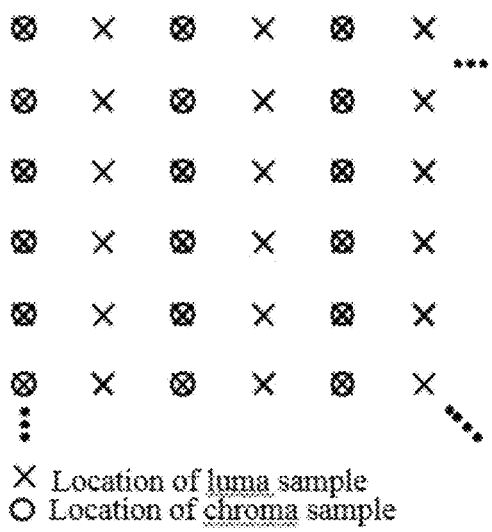
FIG. 7B is a schematic diagram illustrating a nominal vertical and a horizontal locations of 4:2:2 luma and chroma sample in a picture.

In 4:2:2 sampling, as shown in FIG. 7B, each of the two chroma arrays has the same height and half the width of the luma array.

Figure 7C:
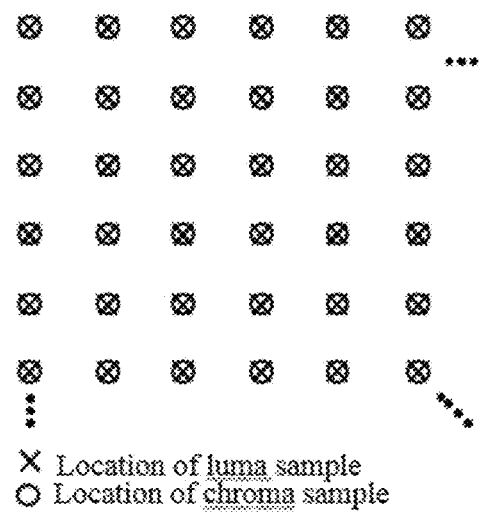
FIG. 7C is a schematic diagram illustrating a nominal vertical and a horizontal locations of 4:4:4 luma and chroma sample in a picture.

In 4:4:4 sampling, as shown in FIG. 7C, depending on the value of separate_colour_plane_flag, the following applies:
If separate_colour_plane_flag is equal to 0, each of the two chroma arrays has the same height and width as the luma array;
Otherwise (separate_colour_plane_flag is equal to 1), the three color planes are separately processed as monochrome sampled pictures.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2 or FIG. 4).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

The encoder 20 (e.g. a video encoder 20) and the decoder 30 (e.g. a video decoder 30) each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 may be referred to as a video encoding device or a video encoding apparatus. Destination device 14 may be referred to as a video decoding device or a video decoding apparatus. Source device 12 and destination device 14 may be examples of video coding devices or video coding apparatuses.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system.

In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

It should be understood that, for each of the above examples described with reference to video encoder 20, video decoder 30 may be configured to perform a reciprocal process. With regard to signaling syntax elements, video decoder 30 may be configured to receive and parse such syntax element and decode the associated video data accordingly. In some examples, video encoder 20 may entropy encode one or more syntax elements into the encoded video bitstream. In such examples, video decoder 30 may parse such syntax element and decode the associated video data accordingly.

Figure 1B:
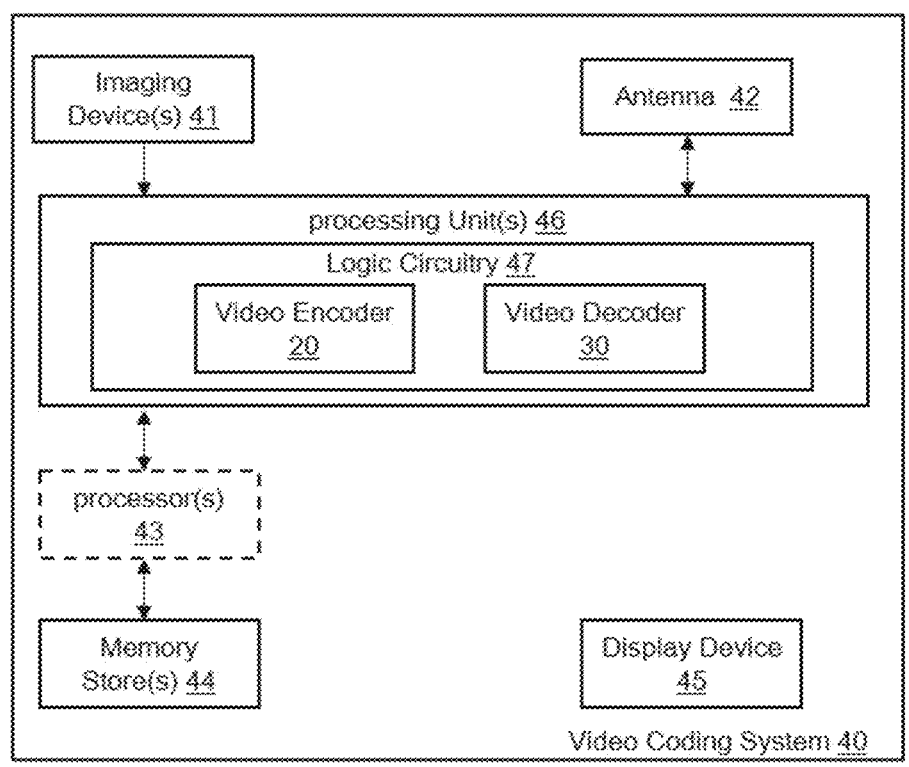
FIG. 1B is a block diagram showing another example of a video coding system according to an embodiment.
Figure 2:
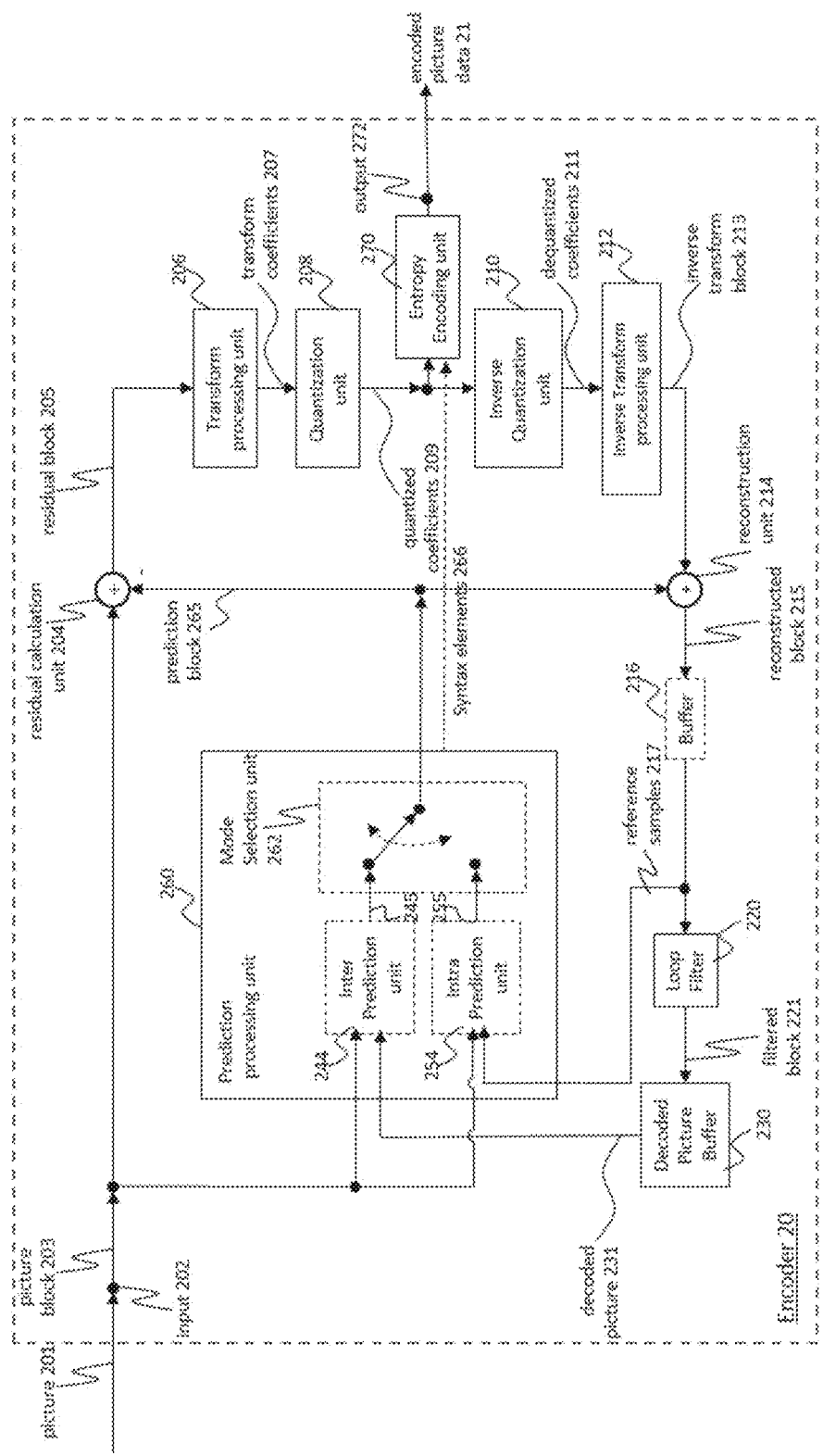
FIG. 2 is a block diagram showing an example of a video encoder according to an embodiment.
Figure 3:
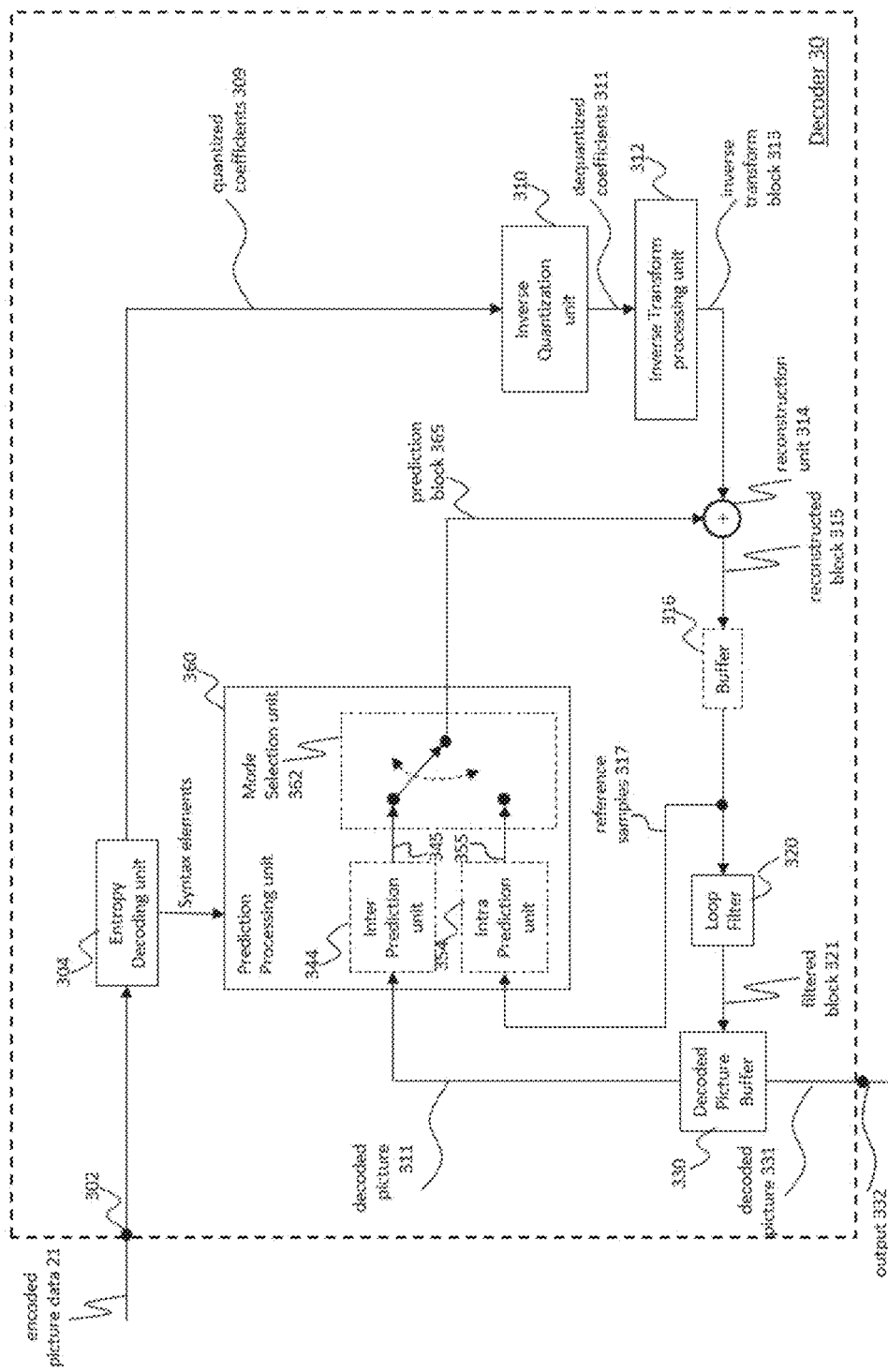
FIG. 3 is a block diagram showing an example structure of a video decoder according to an embodiment.

FIG. 1B is an illustrative diagram of another example video coding system 40 including encoder 20 of FIG. 2 and/or decoder 30 of FIG. 3 according to an embodiment. The system 40 can implement techniques in accordance with various examples described in the present application. In the illustrated embodiment, video coding system 40 may include imaging device(s) 41, video encoder 100, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 100 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 100 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 may be implemented via logic circuitry may include an image buffer (e.g., via either processing unit(s) 420 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

Encoder & Encoding Method

FIG. 2 shows a schematic/conceptual block diagram of an example video encoder 20 according to an embodiment. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 20 may comprise a partitioning unit (not depicted in FIG. 2) configured to partition the picture 201 into a plurality of blocks, e.g. blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In one example, the prediction processing unit 260 of video encoder 20 may be configured to perform any combination of the partitioning techniques described above.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g. a luma array in case of a monochrome picture 201) or three sample arrays (e.g. a luma and two chroma arrays in case of a color picture 201) or any other number and/or kind of arrays depending on the color format applied. The number of samples in horizontal and vertical direction (or axis) of the block 203 define the size of block 203.

Encoder 20 as shown in FIG. 2 is configured encode the picture 201 block by block, e.g. the encoding and prediction is performed per block 203.

The partitioning unit may be configured to partition a picture from a video sequence into a sequence of coding tree units (CTUs), and the partitioning unit may partition (or split) a coding tree unit (CTU) into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In some embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quad-tree structure similar to the coding tree for the CU.

In some embodiments, e.g., according to the latest video coding standard currently in development, which is referred to as Versatile Video Coding (VVC), a combined Quad-tree nested multi-type tree using binary and ternary splits segmentation structure for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quad-tree with nested multi-type tree coding block structure. The exception occurs when maximum supported transform length is smaller than the width or height of the colour component of the CU.VVC develops a unique signaling mechanism of the partition splitting information in quad-tree with nested multi-type tree coding tree structure. In the signallings mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64. TT split is also forbidden when either width or height of a chroma coding block is larger than 32. The pipelining design will divide a picture into Virtual pipeline data units s(VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs sizes In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.
Residual Calculation The residual calculation unit 204 is configured to calculate a residual block 205 based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.
Transform The transform processing unit 206 is configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g. by inverse transform processing unit 212, at a decoder 30 (and the corresponding inverse transform, e.g. by inverse transform processing unit 212 at an encoder 20) and corresponding scaling factors for the forward transform, e.g. by transform processing unit 206, at an encoder 20 may be specified accordingly. QUANTIZATION The quantization unit 208 is configured to quantize the transform coefficients 207 to obtain quantized transform coefficients 209, e.g. by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse de-quantization, e.g. by inverse quantization 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and de-quantization to restore the norm of the residual block, which might get modified because of the scaling used in the fixed point approximation of the equation for quantization step size and quantization parameter. In an embodiment, the scaling of the inverse transform and de-quantization might be combined. Alternatively, customized quantization tables may be used and signaled from an encoder to a decoder, e.g. in a bitstream. The quantization is a lossy operation, wherein the loss increases with increasing quantization step sizes.

The inverse quantization unit 210 is configured to apply the inverse quantization of the quantization unit 208 on the quantized coefficients to obtain de-quantized coefficients 211, e.g. by applying the inverse of the quantization scheme applied by the quantization unit 208 based on or using the same quantization step size as the quantization unit 208. The de-quantized coefficients 211 may also be referred to as de-quantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST), to obtain an inverse transform block 213 in the sample domain. The inverse transform block 213 may also be referred to as inverse transform de-quantized block 213 or inverse transform residual block 213.

The reconstruction unit 214 (e.g. Summer 214) is configured to add the inverse transform block 213 (i.e. reconstructed residual block 213) to the prediction block 265 to obtain a reconstructed block 215 in the sample domain, e.g. by adding the sample values of the reconstructed residual block 213 and the sample values of the prediction block 265.

Optional, the buffer unit 216 (or short "buffer" 216), e.g. a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g. intra prediction.

Embodiments of the encoder 20 may be configured such that, e.g. the buffer unit 216 is not only used for storing the reconstructed blocks 215 for intra prediction 254 but also for the loop filter unit 220 (not shown in FIG. 2), and/or such that, e.g. the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or short "loop filter" 220), is configured to filter the reconstructed block 215 to obtain a filtered block 221, e.g. to smooth pixel transitions, or otherwise improve the video quality. The loop filter unit 220 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 20 (respectively loop filter unit 220) may be configured to output loop filter parameters (such as sample adaptive offset information), e.g. directly or entropy encoded via the entropy encoding unit 270 or any other entropy coding unit, so that, e.g., a decoder 30 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magneto resistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer (DPB) 230 is configured to store the reconstructed block 215.

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction processing unit 260 and mode selection (e.g. by mode selection unit 262) performed by an example encoder 20 will be explained in more detail.

As described above, the encoder 20 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in H.265, or may comprise 67 different intra-prediction modes, e.g. non-directional modes like DC (or mean) mode and planar mode, or directional modes, e.g. as defined in H.266 under developing.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit (not shown in FIG. 2) and motion compensation (MC) unit (not shown in FIG. 2). The motion estimation unit is configured to receive or obtain the picture block 203 (current picture block 203 of the current picture 201) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV).

The motion compensation unit is configured to obtain, e.g. receive, an inter prediction parameter and to perform inter prediction based on or using the inter prediction parameter to obtain an inter prediction block 245. Motion compensation, performed by motion compensation unit (not shown in FIG. 2), may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit 246 may locate the prediction block to which the motion vector points in one of the reference picture lists. Motion compensation unit 246 may also generate syntax elements associated with the blocks and the video slice for use by video decoder 30 in decoding the picture blocks of the video slice.

The intra prediction unit 254 is configured to obtain, e.g. receive, the picture block 203 (current picture block) and one or a plurality of previously reconstructed blocks, e.g. reconstructed neighbor blocks, of the same picture for intra estimation. The encoder 20 may, e.g., be configured to select an intra prediction mode from a plurality of (predetermined) intra prediction modes.

Embodiments of the encoder 20 may be configured to select the intra-prediction mode based on an optimization criterion, e.g. minimum residual (e.g. the intra-prediction mode providing the prediction block 255 most similar to the current picture block 203) or minimum rate distortion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g. in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 20 can be used to encode the video stream. For example, a non-transform based encoder 20 can quantize the residual signal directly without the transform processing unit 206 for certain blocks or frames. In another embodiment, an encoder 20 can have the quantization unit 208 and the inverse quantization unit 210 combined into a single unit.

FIG. 3 shows an example video decoder 30 according to an embodiment. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements from video encoder 100.

In the example of FIG. 3, the decoder 30 comprises an entropy decoding unit 304, an inverse quantization unit 310, an inverse transform processing unit 312, a reconstruction unit 314 (e.g. an accumulator 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter-coded (i.e., B or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 311, e.g. via output 312, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another embodiment, the video decoder 30 can have the inverse-quantization unit 310 and the inverse-transform processing unit 312 combined into a single unit.

Figure 4:
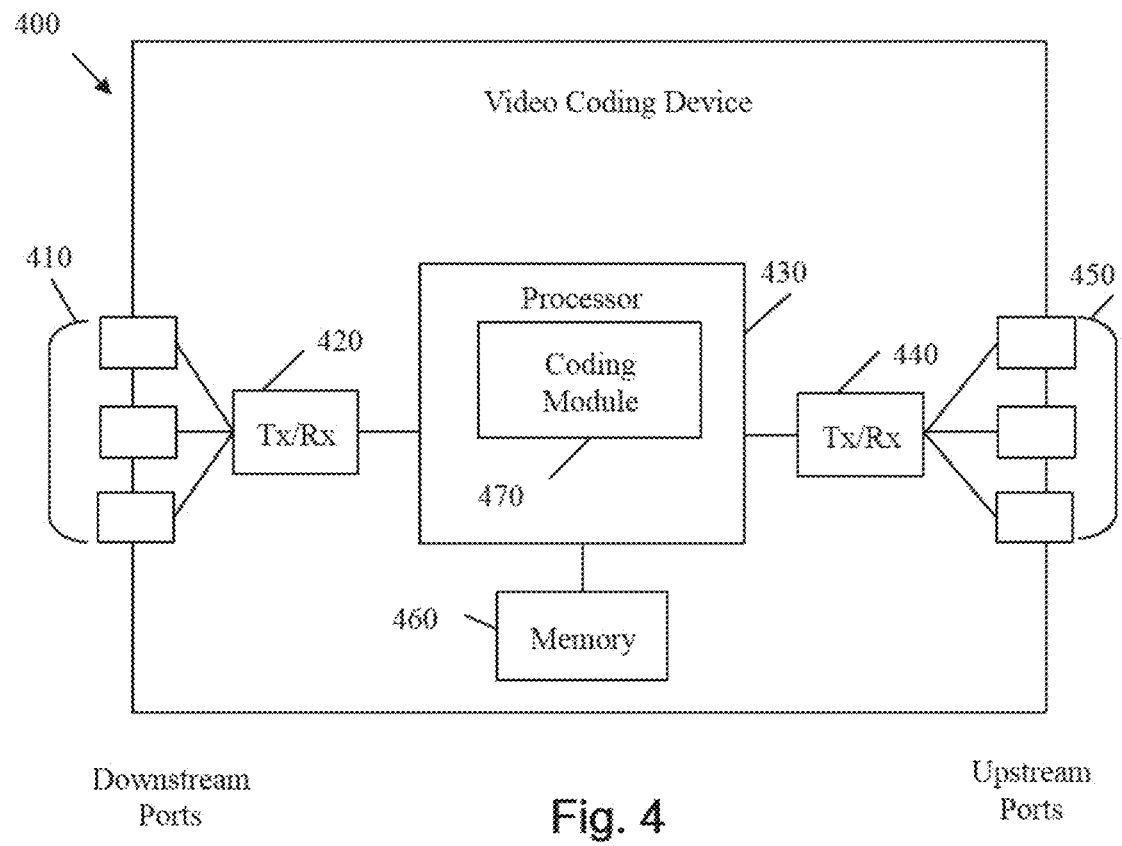
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. In an embodiment, the video coding device 400 may be one or more components of the video decoder 30 of FIG. 1A or the video encoder 20 of FIG. 1A as described above.

The video coding device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
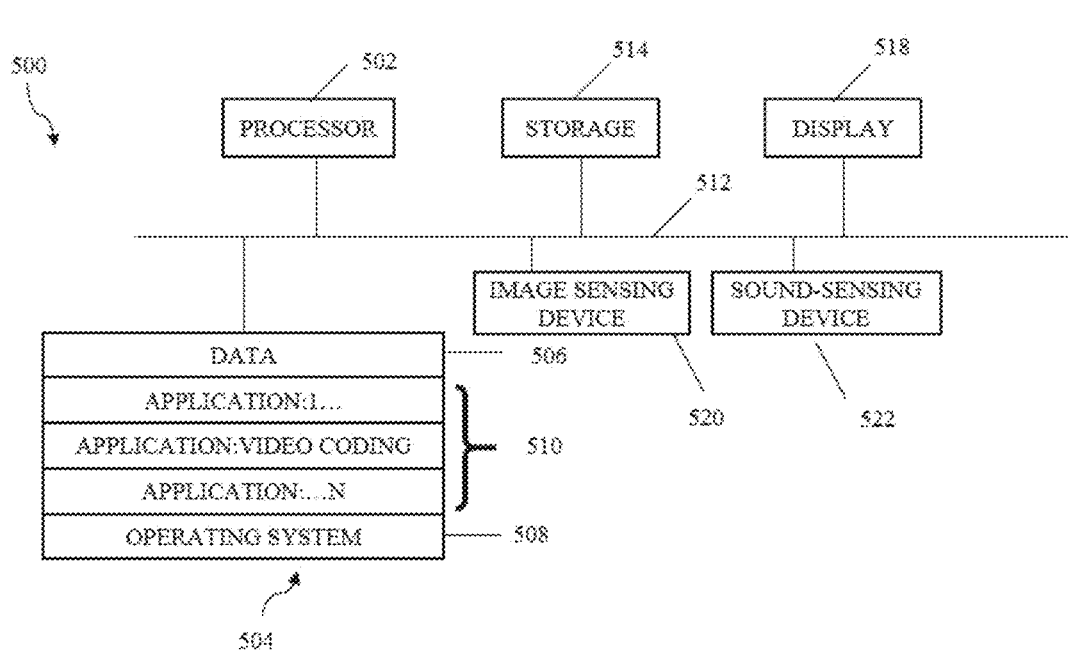
FIG. 5 is a block diagram illustrating another example of an encoding apparatus or a decoding apparatus.

FIG. 5 is a simplified block diagram of an apparatus 500 that may be used as either or both of the source device 310 and the destination device 320 from FIG. 1 according to an embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed embodiments can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an embodiment. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The video encoder 20 may split the input video frame into blocks before encoding. The term "block" in this disclosure is used for any type block or for any depth block, for example, the term "block" is included but not limited to root block, block, sub-block, leaf node, and etc. The blocks to be coded do not necessarily have the same size. One picture may include blocks of different sizes and the block rasters of different pictures of video sequence may also differ. FIGS. 6A-6E illustrate Coding Tree Unit (CTU)/Coding Unit (CU) splitting mode in VVC.

FIG. 6A illustrates a block partition structure by adopting a quad-tree (QT) split. The QT is a tree structure for block partition in which a node of size 4M×4N may be split into four child nodes of size 2M×2N.

FIG. 6B illustrates a block partition structure by adopting a binary tree (BT) split in vertical orientation.

FIG. 6C illustrates a block partition structure by adopting a binary tree (BT) split in horizontal orientation. The BT is a tree structure for block partition in which a node of size 4M×4N may either be horizontally split into two child nodes of size 4M×2N or vertically split into two child nodes of size 2M×4N.

FIG. 6D illustrates a block partition structure by adopting a ternary tree (TT) split in vertical orientation.

FIG. 6E illustrates block partition structure by adopting a ternary tree (TT) split in horizontal orientation. The TT is a tree structure for block partition in which a node of size 4M×4N may either be horizontally split into three child nodes of size 4M×N, 4M×2N and 4M×N, respectively; or vertically split into three child nodes of size M×4N, 2M×4N and M×4N, respectively. Among the three child nodes shown in FIG. 6D or FIG. 6E, the largest node is positioned in the center.

Quad-tree plus binary tree (QTBT) is a quad-tree plus binary tree structure in which a block is first partitioned using quad-tree split, then each quad-tree child node may be further partitioned using binary tree split. Quad-tree plus binary tree or ternary tree (QT-BT/TT) is a quad-tree plus binary tree or ternary tree structure in which a block is first partitioned using quad-tree split, then each quad-tree child node may be further partitioned using binary tree or ternary tree split.

For a block associated with a particular partition depth, encoder 20 determines which partition type (including no further split) is used and signals the determined partition type explicitly or implicitly (e.g., the partition type may be derived from predetermined rules) to decoder 30. Encoder 20 may determine the partition type to use, for example, based on checking rate-distortion costs for the block using different partition types.

The term "block" in the present application is a generalized term which includes but is not limited to root block, block, sub-block, leaf node, and etc.

Video coding standards have introduced Dual Tree (DT) coding in addition to Single Tree (ST) coding which have been used in HEVC/H.265 standard. ST or DT are selected based on slice or frame type (e.g. Intra-frame or Inter-frame, Intra-slice or Inter-slice). Under Single Tree coding mode, Luminance (or Luma) and Chrominance (or Chroma) components share the same partitioning tree. Under the Dual Tree coding mode, Luminance (or Luma) and Chrominance (or Chroma) components are split separately, that is, using independent scheme of partitioning for Luma and Chroma components.

A picture compression level is controlled by quantization parameter (QP) that may be fixed for the whole picture (e.g. by using a same quantization parameter value), or may have different quantization parameter values for different regions of the picture.

One solution for determining quantization parameter is quantization parameter (QP) signaling at coding unit (CU) level. This approach allows to flexibly vary QP value for different regions of the picture, especially at some CU depths (i.e., partition depth, which defines layers of partition). To signal the QP for certain region of the picture, a Delta QP signaling method is used. In this method, the difference (i.e. a delta QP) between a predicted QP($QP_{c\_pred}$) and a real QP of current region is signaled via bitstream. The Delta QP value and its granularity (e.g., the size of the partitioned blocks) are defined by an on-off control flag and a maximal depth (e.g., Delta QP syntax element(s)) in a picture parameter set (PPS). For all CUs with higher partition depth, the delta QP value is not signaled but may inherit from the top level CUs. In HEVC standard, a QP value for Luminance (or Luma) coding block (CB) is derived based on Predicted QP (qPY_PRED), which in its turn depends on CB location in frame/slice/tile. Then $Qp_Y$ variable is derived by following Equation 1:

$$Qp_Y = ((qPY\_PRED + CuQpDeltaVal + 52 + 2*QpBdOffsetY) \% (52 + QpBdOffsetY)) - QpBdOffsetY \quad \text{(Equation 1)}$$

Wherein CuQpDeltaVal is a delta QP value which is signaled or derived for a coding unit (CU); QpBdOffsetY is a constant offset depended on Luma bit depth (From HEVC standard, this term corresponds to "the bit depth of the samples of the luma array"). Finally, quantization parameter $Qp'_Y$ of the Luminance (or Luma) component may be calculated by following Equation 2:

$$Qp'_Y = Qp_Y + QpBdOffsetY \quad \text{(Equation 2)}$$

The variables qPCb and qPCr are set equal to the value of QpC as specified in a quantization table (e.g. Table 1) based on the index qPi equal to qPiCb or qPiCr, respectively, and qPiCb and qPiCr are derived as follows by Equation 3:

qPiCb=Clip3(−QpBdOffsetC,57,QpY+
pps_cb_qp_offset+slice_cb_qp_offset)

qPiCr=Clip3(−QpBdOffsetC,57,QpY+pps_cr_qp_offset+slice_cr_qp_offset) (Equation 3)

Wherein QpBdOffsetC is a constant offset depended on Chroma bit depth (From HEVC standard, this term corresponds to "the bit depth of the samples of the Chroma array"); pps_cb_qp_offset or pps_cr_qp_offset is a fixed offset for Cb component or Cr component signaled by a picture parameter set (PPS), and slice_cb_qp_offset or slice_cr_qp_offset is a fixed offset for Cb component or Cr component which is signaled in a slice header.

$$Clip3(x, y, z) = \begin{cases} x; z < x \\ y; z > y \\ z; \text{otherwise} \end{cases} \quad \text{(Equation 4)}$$

TABLE 1

Specification of QpC as a function of qPi in HEVC as an example

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| QpC | =qPi | 29 | 30 | 31 | 32 | 33 | 33 | 34 | 34 | 35 | 35 | 36 | 36 | 37 | 37 | =qPi − 6 |

The Chroma quantization parameters for the Cb and Cr components (Qp'Cb and Qp'Cr, are derived as follows Equation 5:

Qp'Cb=qPCb+QpBdOffsetC

Qp'Cr=qPCr+QpBdOffsetC (Equation 5)

It should be noted that the delta QP mechanism described above works only for Single Tree (ST) and may not be applied for Dual Tree (DT) because Luminance (or Luma) and Chrominance (or Chroma) components may use different partitioning trees.

Generally, the embodiment(s) of the present application relates to the field of video coding. In specific, the embodiment(s) of the application relates to a delta QP signaling which is a part of de-quantization apparatus in a video decoding device. The embodiment(s) of the present application proposes a different ways of applying delta QP mechanism if Dual Tree (DT) applies.

Similar to the delta QP mechanism described above works only for Single Tree (ST), regardless of the type of Tree (ST or DT), Chroma quantization parameters for the Cb and Cr components are derived based on qPi value according to Equation 6:

Qp'Cb=qPCb+QpBdOffsetC

Qp'Cr=qPCr+QpBdOffsetC (Equation6)

Where qPCb and qPCr are derived based on a quantization table or mapping table (e.g. Table 1) and depend on qPi value. In contrast to the a Delta QP signaling for Single Tree, the present embodiments of the application assumes calculation of the qPi value for Chrominance (or Chroma) component regardless the type of Tree (e.g., Single Tree or Dual Tree) according by following Equation 7:

qPiCb=Clip3(−QpBdOffsetC,69,QpC$_{basic}$+
pps_cb_qp_offset+slice_cb_qp_offset)

qPiCr=Clip3(−QpBdOffsetC,69,QpC$_{basic}$+
pps_cr_qp_offset+slice_cr_qp_offset) (Equation7)

Wherein QpC$_{basic}$ is a basic Chroma block QP value which depend on QP$_{c\_pred}$ value and can be calculated in one of different ways described below.

It should be noted that constant 69 in Equation 7 of calculation qPiCb and qPiCr is selected according to a quantization table (e.g. Table 1) and assuming QP 63 as maximal allowed, so this constant is calculates as maximum QP value added to maximum difference between qPi and QpC. In general case, this constant may be predefined or signaled on some values.

Figure 8:
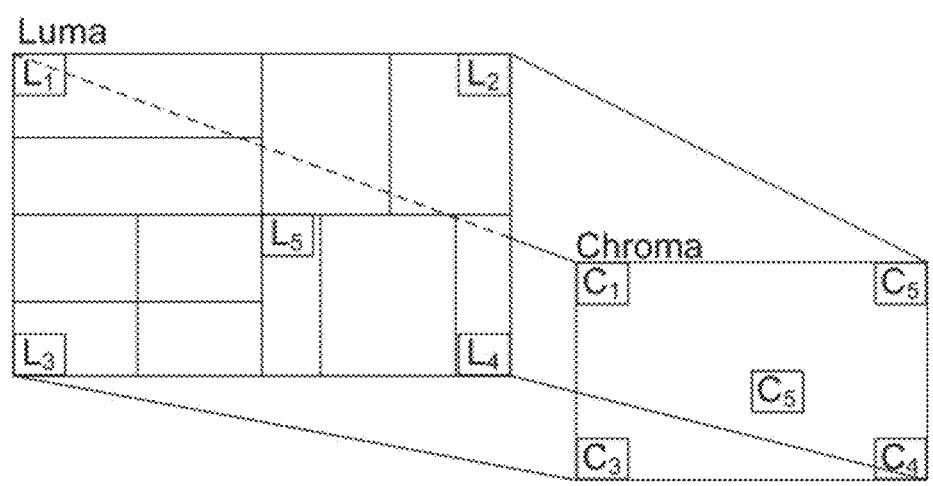
FIG. 8 is a schematic diagram illustrating mapping points from Chrominance (or Chroma) partitioning to Luminance (or Luma) partitioning.

The Dual Tree (DT) coding approach assumes Luma and Chroma components have different partition trees and each own its partitioning tree. It may lead, that one Chroma block (i.e. a block in the Chrominance component) corresponds to more than one Luma block (i.e. a block in the Luminance component) or vice versa. FIG. 8 demonstrates an example for 4:2:0 Chroma subsampling, where the whole Chroma block corresponds to multiple partitioned Luma block. The numbers at the figure represent collocated points (pixels) between Luma and Chroma components (or planes).

Figure 9:
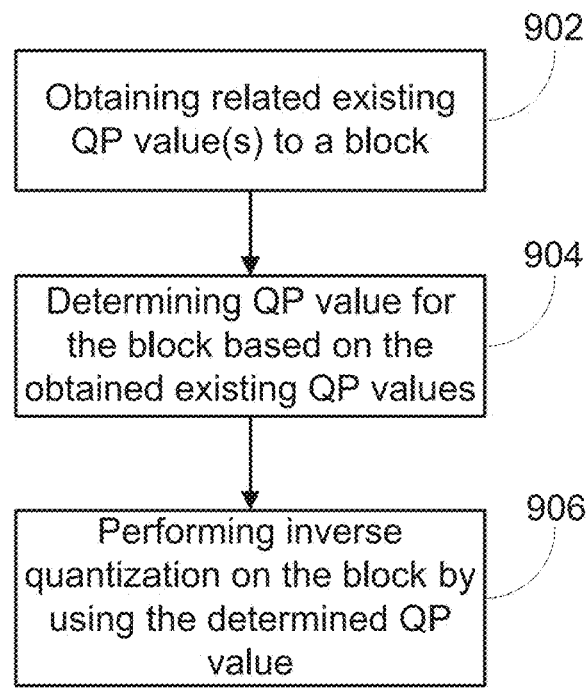
FIG. 9 is an example flow chart illustrating a procedure to determine a QP value for a block in the Chroma component (or Chroma block QP value).

FIG. 9 is an example flowchart illustrating a procedure to perform inverse quantization on a current block of a picture. This procedure may be performed by a decoder. The picture comprises a luminance component and a chrominance component, the luminance component and the chrominance component are partitioned into multiple blocks by separate partition trees.

Operation 902: obtaining one or more existing quantization parameter, QP value from a received bitstream, wherein the one or more existing QP values relate to a current block in the chrominance component.

In this operation, the existing QP values relate to the current block (e.g. the block to be performed by inverse quantization). Just as an example, such existing QP values may comprises at least one of the following: QP value for a collocated block in the Luma component, QP values of one or more neighboring blocks of the current block in the Chroma component, and QP values of one or more neighboring blocks of the collocated block in the Luma component.

A collocated block in the Luma component is a block which has mapping relation to the current block in the Chroma component.

Operation 904: determining a QP value for the current block in the Chrominance (or Chroma) component based on the one or more existing QP values.

There are different sets of methods of determining the QP value for the block in the Chroma component (or Chroma block QP value, i. e. QP$_{c\_pred}$). In summary, a first method set focuses on determining the Chroma block QP value based on the existing related QP values (e.g. to be seen as a prediction), a second method set is to determine the Chroma block QP value based on the existing related QP values (e.g.

to be seen as a prediction), and a chrominance delta QP value signaled in the received bitstream (e.g. to be seen as a delta), a third method set is to determine the Chroma block QP value based on the existing related QP values (e.g. to be seen as a prediction), and a chrominance QP offset value signaled in the received bitstream (e.g. to be seen as an adjusting offset).

Operation 906: performing inverse quantization on the current block in the chrominance component by using the determined QP value.

In this operation, after determining the QP value for the current block in the chrominance component (or Chroma block QP value), the inverse quantization is performed on the block in the chrominance component.

Figure 10:
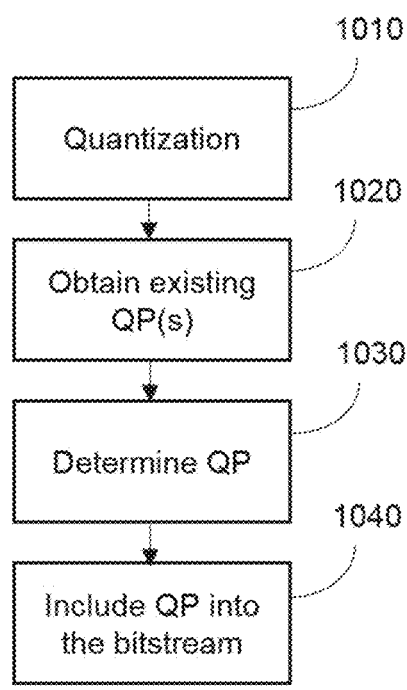
FIG. 10 is an example flow chart illustrating procedure to determine a QP parameter to be inserted into bitstream for the current block.

FIG. 10 is an example flowchart illustrating a procedure to perform inverse quantization on a current block of a picture. This procedure may be performed by an encoder.

Operation 1010: in this operation, the quantization of the current block in the chrominance component is performed using a determined QP. The QP may be determined, for instance, by a user setting and/or by rate-distorting optimization, or the like.

Operation 1020: one or more existing quantization parameter, QP values are obtained. This/these existing QP value(s) are also included into a bitstream. The one or more existing QP value(s) relate(s) to the current block in the chrominance component.

Operation 1030: the QP parameter for the current block in the chrominance component is determined/represented based on the one or more existing QP values and on said determined QP value. In particular, for the purpose of conveying the value of the QP for the current block in chrominance component (the determined QP), a parameter is included into the bitstream, wherein the parameter is determined using the one or more existing QP values. The usage may be performed by subtracting the one or more existing QP values from the determined QP or in another way, e.g. by a formula which also includes further parameters.

Operation 1040: the QP parameter is then included into the bitstream. The inclusion into the bitstream may further comprise entropy coding such as integer codes or arithmetic codes or any other variable length codes. The entropy code may be context adaptive. However, these are only examples and the present disclosure may work with any kind of coding including fixed-length coding.

According to an embodiment, apparatuses are provided for quantizing and inverse quantizing, which may be used at the respective encoder and decoder. They have the features corresponding to the above encoding and decoding methods.

Figure 11:
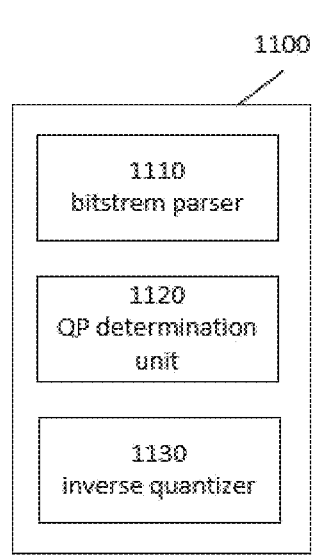
FIG. 11 is a block diagram representing an example apparatus for inverse quantization which may be a part of a decoder.

In particular, an apparatus for inverse quantization of a current block of a picture, wherein the picture comprises a luminance component and a chrominance component, the luminance component and/or the chrominance component are partitioned into multiple blocks. The apparatus is illustrated in FIG. 11 as apparatus 1100. It further includes the following functional units (circuitry):

a bitstream parser (also referred to as bitstream parsing unit_(or circuitry)) 1110 for obtaining one or more existing quantization parameter, QP, values from a bitstream. The one or more existing QP values relate to a current block in the chrominance component. The chrominance component may be any one or more of chrominance components.

a QP determination unit (or circuitry) 1120 for determining a QP value for the current block in the chrominance component based on the one or more existing QP values.

an inverse quantizer (also referred to as inverse quantization unit (or circuitry)) 1130 for performing inverse quantization on the current block in the chrominance component by using the determined QP value.

Figure 12:
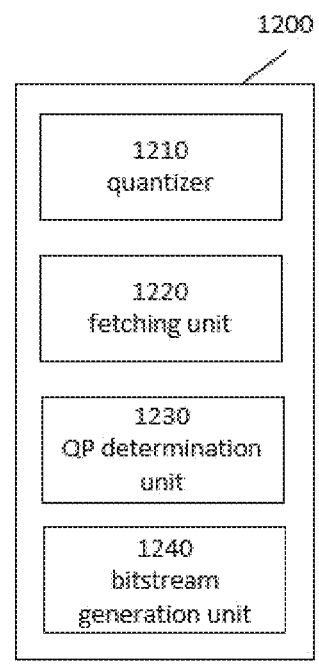
FIG. 12 is a block diagram representing an example apparatus for quantization which may be a part of an encoder.

Also provided is an apparatus 1200 shown in FIG. 12 for quantization of a current block of a picture. The picture comprises a luminance component and a chrominance component, the luminance component and/or the chrominance component are partitioned into multiple blocks. The apparatus comprises:

a quantizer (also referred to as quantization unit (or circuitry)) 1210 for performing quantization on the current block in the chrominance component by using a determined QP value.

a fetching unit (or circuitry) 1220 for obtaining one or more existing quantization parameter, QP values and including the one or more existing QP into a bitstream, wherein the one or more existing QP values relate to a current block in the chrominance component.

a QP determination unit (or circuitry) 1230 for determining a QP parameter for the current block in the chrominance component based on the one or more existing QP values and on said determined QP value.

a bitstream generation unit (or circuitry, also referred to as bitstream generator) 1240 for including the QP parameter into the bitstream.

Below are the embodiments for determining the Chroma block QP value.

I. Determine Chroma Block QP Value Based on One or More Related Existing QP Values In the first method set, three groups of methods are provided.

A. First group of methods: In this method group, the Chroma block QP value $QP_{c\_pred}$ is computed based on a collocated Luma QP value which is denoted as $QP_{c\_pred\_luma}$.

(1) A first method is that, the QP value for the current block in the chrominance component (i.e. the Chroma block QP value) is determined based on QP value of the collocated block in the luminance component. One point at Chroma Plane (or component) is selected (denoted as mapping point, e.g. point $C_5$), the $QP_{c\_pred\_luma}$ is determined to be a QP value from the block collocated with current mapping point (e.g. point $L_5$) in Luma (or Luminance) Plane. For example, if point $C_5$ from FIG. 8 is selected as a mapping point, then $QP_{c\_pred\_luma}$ is equal to Luma QP value from correspondent $L_5$ point in Luma coding block (e.g. the block in which the point $L_5$ is located). It should be understood that any of Chroma points can be selected as mapping points, including but not limited to the above example in FIG. 8.

More specific, Equation 7 can be rewritten in a following way:

$$qPiCb = Clip3(-QpBdOffsetC, 69, QpY\_basic + pps\_cb\_qp\_offset + slice\_cb\_qp\_offset)$$

$$qPiCr = Clip3(-QpBdOffsetC, 69, QpY\_basic + pps\_cr\_qp\_offset + slice\_cr\_qp\_offset) \quad \text{(Equation 7.1)}$$

Where QpY_basic is determined depending on partitioning tree type as follows:

If treeType is equal to SINGLE_TREE, QpY_basic is set equal to QpY.

Otherwise, QpY_basic is set equal to QpY value of collocated Luma CU, which includes Luma sample with coordinates (xCb+cbWidth/2, yCb+cbHeight/2).

And (xCb, yCb) specifying the top-left sample of the luma coding block collocated with current chroma coding block relative to the top-left luma sample of the current picture.

Moreover, QpY value can be calculated according to following formula:

$$QpY=((qPY\_PRED+CuQpDeltaVal+64+2*QpBdOffsetY)\ \%(64+QpBdOffsetY))-QpBdOffsetY$$

Where qPY_PRED, CuQpDeltaVal, QpBdOffsetY are calculated in usual way for collocated Luma CU. The constant was changed to 64.

In other words, in an embodiment, QP of the current block in the chrominance component is determined based on (existing) parameter of a collocated block. The collocated block may be a luminance component block collocated with the current block. Note that in general, the partitioning of the luminance (coding tree) bloc may differ from partitioning of the (coding tree) chrominance block. Thus, there may be more (or less or same number of) luminance blocks covering the same picture area as the same chrominance block. Thus, in the present example, the collocated block is determined as the luminance block, which covers an area including a specific predefined sample of the current chrominance block. For example, the specific sample may be a top-left sample in the bottom right quarter of the current chrominance block. This example sample position is located in the proximity (or in) the center or the current block. However, the present disclosure is not limited to this specific sample position. Any other position may be taken such as top-left or the like.

Appendix A gives detailed example of derivation process for quantization parameters.

(2) A second method is that, the QP value for the current block in the chrominance component (i.e. the Chroma block QP value) is determined based on a weighted sum of existing QP values of the one or more neighboring blocks of the collocated block in the luminance component. In this method, $QP_{c\_pred\_luma}$ is calculated based on collocated values of Luma QP value from several certain points with the same weight. For example, $QP_{c\_pred\_luma}$ may be calculated based on Luma QP values from points which are collocated corner Chroma points $C_1, C_2, C_3, C_4$ by following formula:

$$QP_{c\_pred\_luma} = \frac{LumaQP1 + LumaQP2 + LumaQP3 + LumaQP4}{4} \quad \text{(Equation 8)}$$

Where LumaQP1, . . . , LumaQP4 are QP values of Luma CUs on $L_1, L_2, L_3, L_4$ positions in FIG. 8.

(3) A third method is that, $QP_{c\_pred\_luma}$ is calculated based on intersection of Chroma coding block (CU) value and collocated Luma CU(s) in one of the following ways:

Option 1: If Chroma CU is completely covered by one Luma CU, then $QP_{c\_pred\_luma}$ is taken from Luma CU.

Option 2: If Chroma CU is covered by more than one Luma CUs, and if all such Luma CUs have same QP value, then the $QP_{c\_pred\_luma}$ is taken from the Luma CU.

Option 3: If Chroma CU is covered by more than one Luma CUs, and if not all such Luma CUs have a same QP value, then $QP_{c\_pred\_luma}$ is taken from Luma CUs based on a weighted function of QP values for Luma CUs, where weights for each Luma CU Delta QP are determined by spatial correspondence between current Chroma CU and Luma CUs.

B. Second group of methods: In this method group, Chroma CU QP Prediction is computed based on neighboring Chroma CUs QP values (i.e. QP values of one or more neighboring blocks of the block in the chrominance component) and denoted as $QP_{c\_pred\_chroma}$. That is, QP value for the current block in the chrominance component (i.e. Chroma CUs QP value) is determined based on a weighted sum of existing QP values of the neighboring blocks of the current block in the chrominance component. Methods in this group can operate with any neighboring Chroma CUs, which are already available at the decoder side. In that case $QP_{c\_pred\_chroma}$ can be calculated by following Equation 9:

$$QP_{c\_pred\_chroma} = \frac{1}{|N|}\sum_{n\in N} QP_n \quad \text{(Equation 9)}$$

Where N is a set of neighboring CU(s) with a number N, and $QP_n$ is QP value corresponding to $n^{th}$ neighboring CU from the set.

C. Third group of methods: In this method group, Chroma CU QP value (or Prediction) is computed based on both $QP_{c\_pred\_luma}$ and $QP_{c\_pred\_chroma}$, which may be computed in any of above mentioned methods and Chroma CU QP Prediction is denoted as $QP_{c\_pred\_mixed}$. In this method, the QP value for the current block in the chrominance component (i.e. Chroma CUs QP value) is determined based on both the QP value of collocated block in the luminance component and a weighted sum of existing QP values of the neighboring blocks of the current block in the chrominance component. Alternatively, the QP value for the current block in the chrominance component (i.e. Chroma CUs QP value) is determined based on both a weighted sum of existing QP values of the neighboring blocks of the current block in the chrominance component and a weighted sum of existing QP values of the neighboring blocks of the collocated block in the luminance component. For example, $QP_{c\_pred\_mixed}$ may be calculated as a weighted sum of $QP_{c\_pred\_luma}$ and $QP_{c\_pred\_chroma}$. In an example, it can be calculated by following Equation 10:

$$QP_{c\_pred\_mixed} = \frac{QP_{c\_pred\_luma} + QP_{c\_pred\_chroma}}{2} \quad \text{(Equation 10)}$$

II. Second Method Set to Determine Chroma Block QP Value

In this method set, a QP value for a current block in the Chrominance component (or Chroma block QP value) is determined based on one or more existing QP values and a chrominance delta QP value signaled in the received bitstream, and the one or more existing QP value is related to the current block in the Chrominance component.

This section describes different approaches for determining $QpC_{basic}$ derivation (or delta) when Dual Tree is possible.

(1) A first method: In this method, $QpC_{basic}$ value is directly taken from one of $QP_{c\_pred\_luma}$, $QP_{c\_pred\_chroma}$ or $QP_{c\_pred\_mixed}$ values, which are calculated in any of above-mentioned correspondent approaches in the first method set. In this method, if Dual Tree is used, Luma CU comprises syntax element(s) for Delta Luma QP representation, and Chroma CU does not comprise any syntax elements for Delta Chroma QP representation.

TABLE 2 an example of Delta QP signaling for 1st method

| transform_unit( x0, y0, tbWidth, tbHeight, treeType ) { | Descriptor |
|---|---|
| ... | |
|   if( treeType = = SINGLE_TREE \| \| treeType = = DUAL_TREE_LUMA ){ | |
|     tu_cbf_luma[ x0 ][ y0 ] | ae(v) |
|   if ( tu_cbf_luma[ x0 ][ y0 ]) | |
|     delta_qp( ) | |
|   } | |
|   if( treeType = = SINGLE_TREE \| \| treeType = = DUAL_TREE_CHROMA ) { | |
|     tu_cbf_cb[ x0 ][ y0 ] | ae(v) |
|     tu_cbf_cr[ x0 ][ y0 ] | ae(v) |
|   } | |
| ... | |
| } | |

TABLE 3 another example of Delta QP signaling for 1st method

| transform_unit( x0, y0, tbWidth, tbHeight, treeType ) { | Descriptor |
|---|---|
|   if( treeType = = SINGLE_TREE){ | |
|     tu_cbf_luma[ x0 ][ y0 ] | ae(v) |
|     tu_cbf_cb[ x0 ][ y0 ] | ae(v) |
|     tu_cbf_cr[ x0 ][ y0 ] | ae(v) |
|     if( tu_cbf_luma[ x0 ][ y0 ] \| \| tu_cbf_cb[ x0 ][ y0 ] \| \| tu_cbf_cr[ x0 ][ y0 ] ) | |
|       delta_qp ( ) | |
|   } | |
|   else{ | |
|     if (treeType = = DUAL_TREE_LUMA){ | |
|       tu_cbf_luma[ x0 ][ y0 ] | ae(v) |
|       if( tu_cbf_luma[ x0 ][ y0 ] ) | |
|         delta_qp ( ) | |
|     } | |
|     else /* DUAL_TREE_CROMA */{ | |
|       tu_cbf_cb[ x0 ][ y0 ] | ae(v) |
|       tu_cbf_cr[ x0 ][ y0 ] | ae(v) |
|     } | |
|   } | |
| ... | |
| } | |

Table 2 and Table 3 give two examples how signaling mechanism can be implemented in this method.

In this method, $QpC_{basic}$ is equal to $QP_{c\_pred}$, which in its turn can be equal to one of $QP_{c\_pred\_luma}$, $QP_{c\_pred\_chroma}$ or $QP_{c\_pred\_mixed}$ values. In that case, qPi values for Cb and Cr components can be calculated by following Equation 11:

$$qPiCb=Clip3(-QpBdOffsetC,69,QpC_{basic}+pps\_cb\_qp\_offset+slice\_cb\_qp\_offset)$$

$$qPiCr=Clip3(-QpBdOffsetC,69,QpC_{basic}+pps\_cr\_qp\_offset+slice\_cr\_qp\_offset) \quad \text{(Equation11)}$$

where $QpC_{basic} \in \{QP_{c\_pred\_luma}, QP_{c\_pred\_chroma}, QP_{c\_pred\_mixed}\}$, and each of $QP_{c\_pred\_luma}$, $QP_{c\_pred\_chroma}$, $QP_{c\_pred\_mixed}$ is derived by one of the abovementioned methods. More specific, combining current method with above mentioned method 1 of $QpC_{basic}$ derivation, equation 11 can be rewritten as follows:

$$qPiCb=Clip3(-QpBdOffsetC,69,QpY\_basic+pps\_cb\_qp\_offset+slice\_cb\_qp\_offset)$$

$$qPiCr=Clip3(-QpBdOffsetC,69,QpY\_basic+pps\_cr\_qp\_offset+slice\_cr\_qp\_offset) \quad \text{(Equation 11.1)}$$

Where QpY_basic is determined depending on partitioning tree type as follows:

If treeType is equal to SINGLE_TREE, QpY_basic is set equal to QpY.

Otherwise, QpY_basic is set equal to QpY value of collocated Luma CU, which includes Luma sample with coordinates (xCb+cbWidth/2, yCb+cbHeight/2).

And (xCb, yCb) specifying the top-left sample of the luma coding block collocated with current chroma coding block relative to the top-left luma sample of the current picture.

And QpY value can be calculated according to following formula:

$$QpY=((qPY\_PRED+CuQpDeltaVal+64+2*QpBdOffsetY) \% (64+QpBdOffsetY))-QpBdOffsetY \quad \text{(Equation11.1a)}$$

Where qPY_PRED, CuQpDeltaVal, QpBdOffsetY are calculated in conventional way for collocated Luma CU.

Constant 69 in equation 11 and 11.1 represents a maximal possible QP value increased by 6; constant 64 in equation 11.1a represents a maximal possible QP value increased by 1. Appendix A gives detailed example of derivation process for quantization parameters.

In this method, delta_qp signaling function can be implemented e.g. in following way.

TABLE 4 an example of delta_qp( ) function signaling for 1st method of the method set

| delta_qp( ) { | Descriptor |
|---|---|
|   if( cu_qp_delta_enabled_flag && !IsCuQpDeltaCoded ) { | |
|     cu_qp_delta_abs | ae(v) |
|     if( cu_qp_delta_abs ) | |
|       cu_qp_delta_sign_flag | ae(v) |
|   } | |
| } | |

In Table 4, syntax element cu_qp_delta_enabled_flag represents high level flag which specified whether Delta QP is allowed for current slice/picture/sequence; the flag IsCuLumaQpDeltaCoded specifies whether delta QP is signaled on current depth; for CU blocks on higher or equal depth, deltas_qp is inherited from the closest signaled one. Syntax elements cu_qp_delta_enabled_flag and diff_cu_qp_delta_depth, which is used for IsCuQpDeltaCoded flag derivation, can be signaled in picture parameter set (PPS).

TABLE 5 and example of PPS extension for 1st method of the method set

| pic_parameter_set_rbsp( ) { | Descriptor |
|---|---|
| ... | |
|   cu_qp_delta_enabled_flag | u(1) |
|   if( cu_qp_delta_enabled_flag ) | |
|     diff_cu_qp_delta_depth | ue(v) |
| ... | |
| } | |

More specific, cu_qp_delta_enabled_flag equal to 1 specifies that the diff_cu_qp_delta_depth syntax element is present in the PPS and that cu_qp_delta_abs and cu_qp_delta_sign_flag may be present in the transform unit syntax. cu_qp_delta_enabled_flag equal to 0 specifies that the diff_cu_qp_delta_depth syntax element is not present in the PPS and that cu_qp_delta_abs and cu_qp_delta_sign_flag is not present in the transform unit syntax.

cu_qp_delta_abs specifies the absolute value of the difference CuQpDeltaVal between the luma quantization parameter of the current coding unit and its prediction.

cu_qp_delta_sign_flag specifies the sign of CuQpDeltaVal as follows:

If cu_qp_delta_sign_flag is equal to 0, the corresponding CuQpDeltaVal has a positive value.

Otherwise (cu_qp_delta_sign_flag is equal to 1), the corresponding CuQpDeltaVal has a negative value.

When cu_qp_delta_sign_flag is not present, it is inferred to be equal to 0.

When cu_qp_delta_abs is present, the variables IsCuQpDeltaCoded and CuQpDeltaVal are derived as follows:

IsCuQpDeltaCoded=1

$$CuQpDeltaVal = (-1)^{cu\_qp\_delta\_sign\_flag} * cu\_qp\_delta\_abs$$

The value of CuQpDeltaVal shall be in the range of −(32+QpBdOffsetY/2) to +(31+QpBdOffsetY/2), inclusive.

It should be noted that this method can be used for qPi parameter derivation for Cb and Cr components either for any Chroma CU depth; or only for depths less than some predefined value, CU blocks located at higher or equal depth shall inherit value from the closest processed one.

Alternatively, first method can also signal separate syntax for Delta QP for Chroma component.

TABLE 6 an example of separated delta QP signaling in first method

| transform_unit( x0, y0, tbWidth, tbHeight, treeType ) { | Descriptor |
|---|---|
|   if( treeType = = SINGLE_TREE){ | |
|     tu_cbf_luma[ x0 ][ y0 ] | ae(v) |
|     tu_cbf_cb[ x0 ][ y0 ] | ae(v) |
|     tu_cbf_cr[ x0 ][ y0 ] | ae(v) |
|     if( tu_cbf_luma[ x0 ][ y0 ] \| \| tu_cbf_cb[ x0 ][ y0 ] \| \| | |
|       tu_cbf_cr[ x0 ][ y0 ] ) | |
|       delta_qp_y ( ) | |
|   } | |
|   else{ | |
|     if (treeType = = DUAL_TREE_LUMA){ | |
|       tu_cbf_luma[ x0 ][ y0 ] | ae(v) |
|       if( tu_cbf_luma[ x0 ][ y0 ] ) | |
|         delta_qp_y ( ) | |
|     } | |
|     else /* DUAL_TREE_CROMA */{ | |
|       tu_cbf_cb[ x0 ][ y0 ] | ae(v) |
|       tu_cbf_cr[ x0 ][ y0 ] | ae(v) |
|       if(tu_cbf_cb[ x0 ][ y0 ] \| \| tu_cbf_cr[ x0 ][ y0 ]) | |
|         delta_qp_c ( ) | |
|     } | |
|   } | |
| ... | |
| } | |

TABLE 7 another example of separated delta QP signaling in first method

| transform_unit( x0, y0, tbWidth, tbHeight, treeType ) { | Descriptor |
|---|---|
|   if( treeType = = SINGLE_TREE){ | |
|     tu_cbf_luma[ x0 ][ y0 ] | ae(v) |
|     if( tu_cbf_luma[ x0 ][ y0 ]) | |
|       delta_qp_y ( ) | |
|     tu_cbf_cb[ x0 ][ y0 ] | ae(v) |
|     tu_cbf_cr[ x0 ][ y0 ] | ae(v) |
|     if(tu_cbf_cb[ x0 ][ y0 ] \| \| tu_cbf_cr[ x0 ][ y0 ]) | |
|       delta_qp_c ( ) | |
|   } | |
|   else{ | |
|     if (treeType = = DUAL_TREE_LUMA){ | |

TABLE 7-continued another example of separated delta QP signaling in first method

| tu_cbf_luma[ x0 ][ y0 ] | ae(v) |
|---|---|
|   if( tu_cbf_luma[ x0 ][ y0 ] ) | |
|     delta_qp_y ( ) | |
| } | |
| else /* DUAL_TREE_CROMA */{ | |
|   tu_cbf_cb[ x0 ][ y0 ] | ae(v) |
|   tu_cbf_cr[ x0 ][ y0 ] | ae(v) |
|   if(tu_cbf_cb[ x0 ][ y0 ] \| \| tu_cbf_cr[ x0 ][ y0 ]) | |
|     delta_qp_c ( ) | |
| } | |
| } | |
| ... | |
| } | |

Table 6 and Table 7 give two examples of separate delta QP syntax signaling for chroma component either for Chroma CU in Dual Tree case only or for both Chroma CU in Dual Tree and Single CU in Separate Tree cases. The procedures delta_qp_y ( ) and delta_qp_c ( ) from the Table 6 and Table 7 are implemented in similar way to delta_qp( ) procedure which is shown in Table 4. It should be noted, that in case of separate signaling delta QP syntax for Chroma CU in Dual Tree case and/or for Chroma plane in Single CU, PPS level control flag cu_qp_delta_enabled_flag in Table 4 can be implemented either once (jointly) for both luma and chroma components or separately into two control flags: cu_qp_delta_enabled_flag_luma and cu_qp_delta_enabled_flag_chroma.

Assuming specific case when this method is combined with abovementioned method 1 of $QpC_{basic}$ derivation, equation 11 for either Chroma CU in Dual Tree case or (if applied) for both Chroma CU in Dual Tree and Single CU in Separate Tree cases can be rewritten as follows:

$$qPiCb = Clip3(-QpBdOffsetC, 69, QpY\_basic + pps\_cb\_qp\_offset + slice\_cb\_qp\_offset + delta\_qp\_c)$$

$$qPiCr = Clip3(-QpBdOffsetC, 69, QpY\_basic + pps\_cr\_qp\_offset + slice\_cr\_qp\_offset + delta\_qp\_c) \quad \text{(Equation 11.2)}$$

Where QpY_basic is determined depending on partitioning tree type as follows:

If treeType is equal to SINGLE_TREE, QpY_basic is set equal to QpY.

Otherwise, QpY_basic is set equal to QpY value of collocated Luma CU, which includes Luma sample with coordinates (xCb+cbWidth/2, yCb+cbHeight/2).

And (xCb, yCb) specifying the top-left sample of the luma coding block collocated with current chroma coding block relative to the top-left luma sample of the current picture.

And QpY value can be calculated according to following formula:

$$QpY = ((qPY\_PRED + CuQpDeltaVal + 64 + 2*QpBdOffsetY) \% (64+QpBdOffsetY)) - QpBdOffsetY \quad \text{(Equation 11.3)}$$

Where qPY_PRED, CuQpDeltaVal, QpBdOffsetY are calculated in conventional way for collocated Luma CU.

Constant 69 in equation 11.2 represents a maximal possible QP value increased by 6; constant 64 in equation 11.3 represents a maximal possible QP value increased by 1.

Alternatively, delta_qp_c value can be added to final equations for Qp'Cb and Qp'Cb:

$$Qp'Cb = QpCb + QpBdOffsetC + delta\_qp\_c$$

$$Qp'Cr = QpCr + QpBdOffsetC + delta\_qp\_c$$

In this case, equation 11.1 is used for calculation qPiCb and qPiCr values and then calculations of QpCb and QpCr values are performed in conventional way based on qPiCb and qPiCr using chroma QP mapping function. A conventional chroma QP mapping function is demonstrated in Table 15.

(2) A second method: In this method, $QpC_{basic}$ value is derived as a sum of one of $QP_{c\_pred\_luma}$, $QP_{c\_pred\_chroma}$ or $QP_{c\_pred\_mixed}$ values, which are calculated in any of abovementioned correspondent prediction approaches, and a CuQpChromaDeltaVal value, which can be signaled in Chroma CU. In this method, in case of Dual Tree, Luma CU comprises syntax element(s) for Delta Luma CU representation, and Chroma CU comprises syntax elements for Delta Chroma CU difference representation.

TABLE 6 an example of Delta QP signaling for $2^{nd}$ method

| | Descriptor |
|---|---|
| transform_unit( x0, y0, tbWidth, tbHeight, treeType ) { | |
| ... | |
|   if( treeType = = SINGLE_TREE \| \| treeType = = DUAL_TREE_LUMA ){ | |
|     tu_cbf_luma[ x0 ][ y0 ] | ae(v) |
|     if ( tu_cbf_luma[ x0 ][ y0 ]) | |
|       delta_qp_luma( ) | |
|   } | |
|   if( treeType = = SINGLE_TREE \| \| treeType = = DUAL_TREE_CHROMA ) { | |
|     tu_cbf_cb[ x0 ][ y0 ] | ae(v) |
|     tu_cbf_cr[ x0 ][ y0 ] | ae(v) |

TABLE 6-continued an example of Delta QP signaling for $2^{nd}$ method

| |
|---|
|     if (tu_cbf_cb[ x0 ][ y0 ] \| tu_cbf_cr[ x0 ][ y0 ]) |
|       delta_qp_chroma( ) |
|   } |
| ... |
| } |

In this method $QpC_{basic}$ can be calculated by following Equation 12:

$$QpC_{basic} = QP_{c\_pred} + CuQpChromaDeltaVal \quad \text{(Equation 12)}$$

Where $QP_{c\_pred} \in \{Q_{c\_pred\_luma}, QP_{c\_pred\_chroma}, QP_{c\_pred\_mixed}\}$, and each of $QP_{c\_pred\_luma}$, $QV_{c\_pred\_chroma}$, $QV_{c\_pred\_mixed}$ is derived by one of the abovementioned methods; CuQpChromaDeltaVal is Delta QP value for Chroma blocks, which can be derived by following Equation 13.

$$CuQpChromaDeltaVal = cu\_chroma\_qp\_delta\_abs * (1 - 2 * cu\_chroma\_qp\_delta\_sign\_flag) \quad \text{(Equation 13)}$$

In that case, qPi values for Cb and Cr components can be calculated by following Equation 14:

$$qPiCb = Clip3(-QpBdOffsetC, 69, QpC_{basic} + pps\_cb\_qp\_offset + slice\_cb\_qp\_offset)$$

$$qPiCr = Clip3(-QpBdOffsetC, 69, QpC_{basic} + pps\_cr\_qp\_offset + slice\_cr\_qp\_offset) \quad \text{(Equation 14)}$$

In this method, delta_qp_luma and delt_qp_chroma signaling functions can be implemented e.g. in the following way.

TABLE 7 an example of delta_qp_luma signaling for $2^{nd}$ method

| delta_qp_luma( ) { | Descriptor |
|---|---|
|   if( cu_luma_qp_delta_enabled_flag && !IsLumaCuQpDeltaCoded ) { | |
|     cu_luma_qp_delta_abs | ae(v) |
|     if( cu_luma_qp_delta_abs ) | |
|       cu_luma_qp_delta_sign_flag | ae(v) |
|   } | |
| } | |

In Table 7, syntax element cu_luma_qp_delta_enabled_flag represents high level flag which specified whether delta luma QP is allowed for current slice/picture/sequence; the flag IsCuLumaQpDeltaCoded specifies whether delta QP is signaled on current depth; for Luma CU blocks on higher or equal depth, delta_luma_qp( ) elements are inherited from the closest signaled one. Syntax elements cu_luma_qp_delta_enabled_flag and diff_cu_luma_qp_delta_depth, which are used for IsLumaCuQpDeltaCoded flag derivation and can be signaled in PPS.

TABLE 8 an example of delta_qp_chroma signaling for $2^{nd}$ method

| delta_qp_chroma( ) { | Descriptor |
|---|---|
|   if( cu_chroma_qp_delta_enabled_flag && !IsChromaCuQpDeltaCoded ) { | |
|     cu_chroma_qp_delta_abs | ae(v) |
|     if( cu_chroma_qp_delta_abs ) | |
|       cu_chroma_qp_delta_sign_flag | ae(v) |
|   } | |
| } | |

In Table 8, syntax element cu_chroma_qp_delta_enabled_flag represents high level flag which specified whether delta chroma CU is allowed for current slice/picture/sequence; the flag IsCuChromaQpDeltaCoded specifies whether delta QP is signaled on current depth; for Chroma CU blocks on higher or equal depth, delta_chroma_qp( ) elements are inherited from the closest signaled one. Syntax elements cu_chroma_qp_delta_enabled_flag and diff_cu_chroma_qp_delta_depth, which are used for IsChromaCuQpDeltaCoded flag derivation and can be signaled in PPS.

TABLE 9 an example of PPS extension for $2^{nd}$ method

| pic_parameter_set_rbsp( ) { | Descriptor |
|---|---|
| ... | |
| cu_luma qp_delta_enabled_flag | u(1) |
| cu_chroma qp_delta_enabled_flag | u(1) |
| if( cu_luma_qp_delta_enabled_flag ) | |
| diff_cu_luma_qp_delta_depth | ue(v) |
| if( cu_chroma_qp_delta_enabled_flag ) | |
| diff_cu_chroma_qp_delta_depth | ue(v) |
| ... | |
| } | |

(3) A third method: In this method $QpC_{basic}$ value is derived as a sum of one of $QP_{c\_pred\_luma}$, $QP_{c\_pred\_chroma}$ or $QP_{c\_pred\_mixed}$ values, which are calculated in any of abovementioned correspondent prediction approaches, and a CuQpChromaDeltaVal value, which can be signaled in Chroma CU, only on Chroma CU depth at some predefined depths. All Chroma CUs with depth higher than predefined one, $QpC_{basic}$ value is inherited from closest processed one. In this method, in case of Dual Tree, Luma CU comprises syntax element(s) for Delta Luma QP representation, and Chroma CU comprises a syntax elements for Delta Chroma QP representation only for Chroma CU with depth less or equal than a predefined one.

In this method, Delta QP value can be signaled according to Table 5 and Table 6, and delta_qp_chroma( ) function can be implemented in a following way:

TABLE 10 an example of delta_qp_chroma signaling for $2^{nd}$ method

| delta_qp_chroma( ) { | Descriptor |
|---|---|
| if( cu_chroma_qp_delta_enabled_flag | |
| && !IsChromaCuQpDeltaCoded ) { | |
| cu_chroma_qp_delta_abs | ae(v) |
| if( cu_chroma_qp_delta_abs ) | |
| cu_chroma_qp_delta_sign_flag | ae(v) |
| } | |
| } | |

The IsChromaCuQpDeltaCoded flag in Table 10 is equal to 0 only for Chroma CU with depths less or equal than predefined one.

(4) A fourth method: In this method, special syntax element can specify which type of prediction computation is used. A high level element cu_qp_chroma_der_type can be signaled in one of codec parameter sets, e.g. PPS and specify which type of any abovementioned predictor computation approaches is used.

TABLE 11 and example of PPS extension for $4^{th}$ method

| pic_parameter_set_rbsp( ) { | Descriptor |
|---|---|
| ... | |
| if( cu_qp_delta_enabled_flag ) | |
| cu_qp_chroma_der_type | u(n) |
| ... | |
| } | |

In this method cu_qp_chroma_der_type can specify either group of prediction type, and then any certain predefined abovementioned prediction can be used within the group.

It should be noticed, that cu_qp_chroma_der_type represents an index in the set P and then $QpC_{basic}$ values for Cb and Cr components are derived based on $QP_{c\_pred}$ in one of abovementioned methods from 1st to 3rd.

(5) A fifth method: In this method, cu_qp_chroma_der_type can specify one certain prediction type among all groups. For example, assuming the set of possible predictions P={ChromaQpPredictionLuma1, ... , ChromaQpPredictionChroma1, ChromaQpPredictionMixed1, ... , ChromaQpPredictionMixedN}

It should be noticed, that cu_qp_chroma_der_type represents an index in the set P and then $QpC_{basic}$ values for Cb and Cr components are derived based on $QP_{c\_pred}$ in one of abovementioned methods from 1st to 3rd, where $QP_{c\_pred}$=P[cu_qp__chroma_qp_der_type].

III. Third Method Set to Determine Chroma Block QP Value

Determining a QP value for a current block in the Chrominance component based on one or more existing QP values and a chrominance QP offset value (or Delta QP Offset) signaled in the received bitstream, and the one or more existing QP value is related to the current block in the Chrominance component.

This section discloses Chroma QP Offset mechanism usage in case of Separate Tree (ST) is possible.

In a first method, Cb and Cr QP values Qp'Cb and Qp'Cr are calculated based on qPiCb and qPiCr, where qPiCb and qPiCr are calculated by following Equation 15:

$$qPiCb = Clip3(-QpBdOffsetC, 69, QpC_{basic} + pps\_cb\_qp\_offset + slice\_cb\_qp\_offset + CuQpOffsetCb)$$

$$qPiCr = Clip3(-QpBdOffsetC, 69, QpC_{basic} + pps\_cr\_qp\_offset + slice\_cr\_qp\_offset + CuQpOffsetCr) \quad \text{(Equation 15)}$$

Where $QpC_{basic}$ value is directly taken from one of $QP_{c\_pred\_luma}$, $QP_{c\_pred\_chroma}$ or $QP_{c\_pred\_mixed}$ values, which are calculated in any of above mentioned correspondent prediction approaches; and CuQpOffsetCb/CuQpOffsetCr variables are derived based on cb_qp_offset_list and cu_chroma_qp_offset_idx syntax element by following Equation 16:

$$CuQpOffsetCb = cb\_qp\_offset\_list[cu\_chroma\_qp\_offset\_idx]$$

$$CuQpOffsetCr = cr\_qp\_offset\_list[cu\_chroma\_qp\_offset\_idx] \quad \text{(Equation 16)}$$

Syntax elements cb_qp_offset_list and cr_qp_offset_list are the offset tables, which can be signaled in parameter set, e.g. in PPS in following way.

TABLE 12 an example of Chroma QP offset signaling in PPS

| | Descriptor |
|---|---|
| pic_parameter_set_rbsp( ) { | |
| ... | |
|    chroma_qp_offset_list_enabled_flag | u(1) |
|    if( chroma_qp_offset_list_enabled_flag ) { | |
|      chroma_qp_offset_list_len_minus1 | ue(v) |
|      for( i = 0; i <= chroma_qp_offset_list_len_minus1; i++ ) { | |
|        cb_qp_offset_list[ i ] | se(v) |
|        cr_qp_offset_list[ i ] | se(v) |
|      } | |
|    } | |
| ... | |
| } | |

In Table 12, chroma_qp_offset_list_enabled_flag specifies whether the Chroma QP lists mechanism is used or not; chroma_qp_offset_list_len_minus1 specifies the length of offset lists for Cb and Cr components; and cb_qp_offset_list and cr_qp_offset_list specify possible offsets for Cb and Cr components.

cu_chroma_qp_offset_dx specifies the certain element in cb_qp_offset_list and cr_qp_offset_list which may be used for CuQpOffsetCb and CuQpOffsetCr calculation.

Table 13 demonstrates an example of cu_chroma_qp_offset_idx signaling.

TABLE 13 an example of Chroma QP offset signaling

| | Descriptor |
|---|---|
| chroma_qp_offset( ) { | |
|   if( cu_chroma_qp_offset_enabled_flag && !IsCuChromaQpOffsetCoded ) { | |
|     cu_chroma_qp_offset_flag | ae(v) |
|     if( cu_chroma_qp_offset_flag && chroma_qp_offset_list_len_minus1 > 0) | |
|       cu_chroma_qp_offset_idx | ae(v) |
|   } | |
| } | |

The syntax of Delta QP Offset if Separate Tree is possible, may be described in following Table 14.

TABLE 14 an example of Delta QP offset usage in case of Separate Tree

| | Descriptor |
|---|---|
| transform_unit( x0, y0, tbWidth, tbHeight, treeType ) { | |
| ... | |
|   if( treeType == SINGLE_TREE || treeType == DUAL_TREE_LUMA ){ | |
|     tu_cbf_luma[ x0 ][ y0 ] | ae(v) |
|     if ( tu_cbf_luma[ x0 ][ y0 ]) | |
|       delta_qp_luma( ) | |
|   } | |
|   if( treeType == SINGLE_TREE || treeType == DUAL_TREE_CHROMA ) { | |
|     tu_cbf_cb[ x0 ][ y0 ] | ae(v) |
|     tu_cbf_cr[ x0 ][ y0 ] | ae(v) |
|     if (tu_cbf_cb[ x0 ][ y0 ] || tu_cbf_cr[ x0 ][ y0 ]) | |
|       chroma_qp_offset( ) | |
|   } | |
| ... | |
| } | |

According to another embodiment of the present application, the method for derivation process for quantization parameters is described as follows:

Appendix A. Derivation Process for Quantization Parameters

In this process, the luma quantization parameter $Qp'_Y$ and the chroma quantization parameters $Qp'_{Cb}$ and $Qp'_{Cr}$ are derived.

Input to this process is a luma location (xCb, yCb) specifying the top-left sample of the current luma coding block relative to the top-left luma sample of the current picture in case of treeType equals to SINGLE_TREE or DUAL_TREE_LUMA; and (xCb, yCb) specifying the top-left sample of the luma coding block collocated with current chroma coding block relative to the top-left luma sample of the current picture in case of treeType equals to DUAL_TREE_CHROMA.

In this process, the variable QpY, the luma quantization parameter Qp'Y, and the chroma quantization parameters Qp'Cb and Qp'Cr are derived.

The luma location (xQg, yQg), specifies the top-left luma sample of the current quantization group relative to the top-left luma sample of the current picture. The horizontal and vertical positions xQg and yQg are set equal to xCb−(xCb & ((1<<Log 2MinCuQpDeltaSize)−1)) and yCb−(yCb & ((1<<Log 2MinCuQpDeltaSize)−1)), respectively. The luma size of a quantization group, Log 2MinCuQpDeltaSize, determines the luma size of the smallest area inside a coding tree block that shares the same qPY_PRED.

The predicted luma quantization parameter qPY_PRED is derived by the following ordered operations:

1. The variable qPY_PREV is derived as follows:
   If one or more of the following conditions are true, qPY_PREV is set equal to SliceQpY:
   The current quantization group is the first quantization group in a slice.
   The current quantization group is the first quantization group in a tile.
   The current quantization group is the first quantization group in a coding tree block row and entropy_coding_sync_enabled_flag is equal to 1.

Otherwise, qPY_PREV is set equal to the luma quantization parameter QpY of the last coding unit in the previous quantization group in decoding order.
2. The availability derivation process for a block in z-scan order as specified in clause XXX is invoked with the location (xCurr, yCurr) set equal to (xCb, yCb) and the neighbouring location (xNbY, yNbY) set equal to (xQg−1, yQg) as inputs, and the output is assigned to availableA. The variable QpY_A is derived as follows:
If one or more of the following conditions are true, QpY_A is set equal to qPY_PREV:
availableA is equal to FALSE.
the coding tree block address ctbAddrA of the coding tree block containing the luma coding block covering the luma location (xQg−1, yQg) is not equal to CtbAddrInTs, where ctbAddrA is derived as follows:

xTmp=(xQg−1)>>Log 2 MinTrafoSize yTmp=yQg>>Log 2 MinTrafoSize minTbAddrA=MinTbAddrZs[xTmp][yTmp]

ctbAddrA=minTbAddrA>>(2*(Ctb Log 2SizeY−Log 2 MinTrafoSize

Otherwise, QpY_A is set equal to the luma quantization parameter QpY of the coding unit containing the luma coding block covering (xQg−1, yQg).
3. The availability derivation process for a block in z-scan order as specified in clause XXX is invoked with the location (xCurr, yCurr) set equal to (xCb, yCb) and the neighbouring location (xNbY, yNbY) set equal to (xQg, yQg−1) as inputs, and the output is assigned to availableB. The variable QpY_B is derived as follows:
If one or more of the following conditions are true, QpY_B is set equal to qPY_PREV:
availableB is equal to FALSE.
the coding tree block address ctbAddrB of the coding tree block containing the luma coding block covering the luma location (xQg, yQg−1) is not equal to CtbAddrInTs, where ctbAddrB is derived as follows:

xTmp=xQg>>Log 2 MinTrafoSize yTmp=(yQg−1)>>Log 2MinTrafoSize minTbAddrB=MinTbAddrZs[xTmp][yTmp]

ctbAddrB=minTbAddrB>>(2*(CtbLog 2SizeY−Log 2 MinTrafoSize

Otherwise, QpY_B is set equal to the luma quantization parameter QpY of the coding unit containing the luma coding block covering (xQg, yQg−1).
4. The predicted luma quantization parameter qPY_PRED is derived as follows:

qPY_PRED=(QpY_A+QpY_B+1)>>1

The variable QpY is derived as follows:

QpY=((qPY_PRED+CuQpDeltaVal+64+2*QpBdOffsetY) %(64+QpBdOffsetY))−QpBdOffsetY

The luma quantization parameter $Qp'_Y$ is derived as follows:

$Qp'_Y$=QpY+QpBdOffsetY

The variables QpCb and QpCr are set equal to the value of QpC as specified in Table 15 based on the index qPi equal to qPiCb and qPiCr, respectively, and qPiCb and qPiCr are derived as follows:

qPiCb=Clip3(−QpBdOffsetC,69,QpY_basic+ pps_cb_qp_offset+slice_cb_qp_offset)

qPiCr=Clip3(−QpBdOffsetC,69,QpY_basic+ pps_cr_qp_offset+slice_cr_qp_offset)

Where QpY_basic is determined depending on partitioning tree type as follows:
If treeType is equal to SINGLE_TREE, QpY_basic is set equal to QpY.
Otherwise, QpY_basic is set equal to QpY value of collocated Luma CU, which includes Luma sample with coordinates (xCb+cbWidth/2, yCb+cbHeight/2).

The chroma quantization parameters for the Cb and Cr components, $Qp'_{Cb}$ and $Qp'_{Cr}$, are derived as follows:

$Qp'_{Cb}$=QpCb+QpBdOffsetC $Qp'_{Cr}$=QpCr+QpBdOffsetC

TABLE 15

| Specification of QpC as a function of qPi (chroma QP mapping function) | | | | | | | | | | | | | | | |
|---|---|---|---|---|---|---|---|---|---|---|---|---|---|---|---|
| qPi | <30 | 30 | 31 | 32 | 33 | 34 | 35 | 36 | 37 | 38 | 39 | 40 | 41 | 42 | 43 | >43 |
| QpC | =qPi | 29 | 30 | 31 | 32 | 33 | 33 | 34 | 34 | 35 | 35 | 36 | 36 | 37 | 37 | =qPi − 6 |

According to an embodiment, wherein the method further comprises: determining the QP value for the current block in the chrominance component based on a weighted sum of existing QP values of the one or more neighboring blocks of the collocated block in the luminance component.

Just for example, there are four neighboring blocks of the collocated block in the luminance component, so the QP value for the current block in the Chrominance component is an average sum of the QP values for the four neighboring blocks of the collocated block in the luminance component.

It is needed to be mentioned here the on some occasion, the neighboring blocks of the collocated block may be not existed. Under this circumstance, it is recommend to using other existing QP values to determine the QP value of the block in the chrominance component.

According to an embodiment, the method further comprises: determining the QP value for the current block in the chrominance component based on a weighted sum of existing QP values of the neighboring blocks of the current block in the chrominance component.

According to an embodiment, the method further comprises: determining the QP value for the current block in the chrominance component based on both the QP value of collocated block in the luminance component and a weighted sum of existing QP values of the neighboring blocks of the current block in the chrominance component.

According to an embodiment, wherein the method further comprises: determining the QP value for the current block in the chrominance component based on both a weighted sum of existing QP values of the neighboring blocks of the current block in the chrominance component and a weighted sum of existing QP values of the neighboring blocks of the collocated block in the luminance component.

Following is an explanation of the applications of the encoding method as well as the decoding method as shown in the above-mentioned embodiments, and a system using them.

Figure 13:
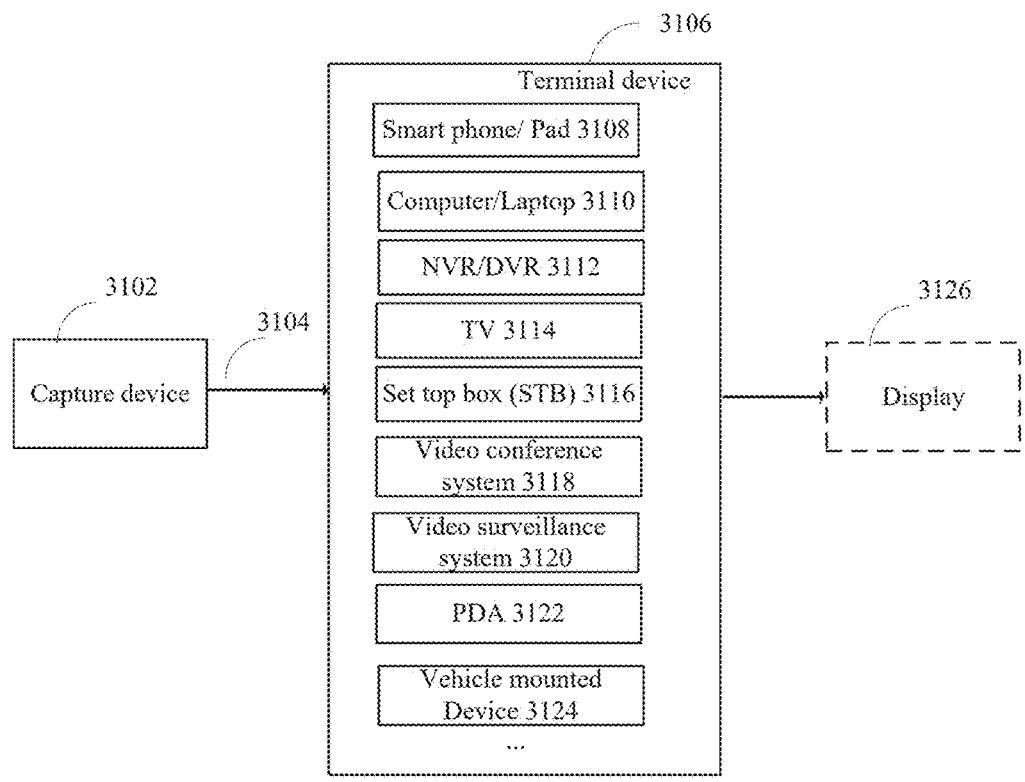
FIG. 13 is a block diagram showing an example structure of a content supply system which realizes a content delivery service.

FIG. 13 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 14:
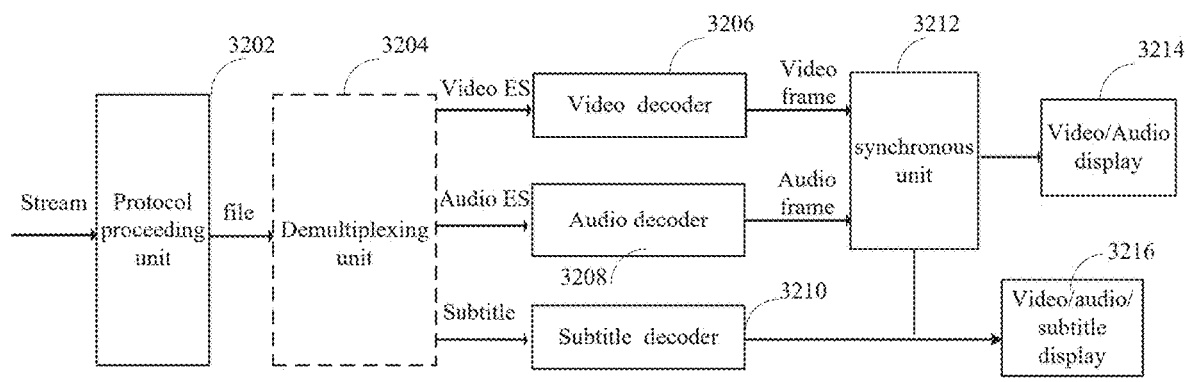
FIG. 14 is a block diagram showing a structure of an example of a terminal device.

FIG. 14 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 14) before feeding it to the synchronous unit 3212. Similarly, the audio frame may store in a buffer (not shown in FIG. 14) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present application is not limited to the above-mentioned system, and either the picture encoding device or the picture decoding device in the above-mentioned embodiments can be incorporated into other system, for example, a car system.

In a first example, a method is provided for inverse quantization of a current block of a picture, wherein the method is performed by a decoder, and the picture comprises a luminance component and a chrominance component, the luminance component and/or the chrominance component are partitioned into multiple blocks, and the method comprising: obtaining one or more existing quantization parameter, QP values from a received bitstream, wherein the one or more existing QP values relate to a current block in the chrominance component; determining a QP value for the current block in the chrominance component based on the one or more existing QP values; performing inverse quantization on the current block in the chrominance component by using the determined QP value.

For example, the one or more existing QP values comprises at least one of the following: a QP value of a collocated block in the luminance component; one or more neighboring blocks of the collocated block in the luminance component; and one or more neighboring blocks of the current block in the chrominance component.

In an embodiment, the method further comprises: determining the QP value for the current block in the chrominance component based on the QP value of the collocated block in the luminance component.

Alternatively or in addition, the operation of determining the QP value for the current block in the chrominance component based on the QP value of the collocated block in the luminance component, comprises: determining luminance block collocated with top-left sample in the bottom-right quarter of the current chrominance block; retrieving QP value (QpY_basic) of determined luminance block; determining qPiCb and qPiCr parameters for the current chrominance block by using following formulas or new formulas derived from the following formulas: qPiCb=Clip3(−QpBdOffsetC, 69, QpY_basic+pps_cb_qp_offset+slice_cb_qp_offset), and/or qPiCr=Clip3(−QpBdOffsetC, 69, QpY_basic+pps_cr_qp_offset+slice_cr_qp_offset); determining QP values for the current block in the chrominance component based on the qPiCb and qPiCr parameters or values.

In an embodiment, the QP values for the current block in the chrominance component is determined according to following formulas or new formulas derived from the following formulas: Qp'Cb=QpCb+QpBdOffsetC+delta_qp_c, and/or Qp'Cr=QpCr+QpBdOffsetC+delta_qp_c; wherein QpCb and QpCr are obtained from the qPiCb and qPiCr parameters by applying a chroma QP mapping function.

For example, the operation of determining the QP value for the current block in the chrominance component based on the QP value of the collocated block in the luminance component, comprises: determining luminance block collocated with top-left sample in the bottom-right quarter of the current chrominance block; retrieving QP value (QpY_basic) of determined luminance block; determining qPiCb and qPiCr parameters for the current chrominance block by using following formulas or new formulas derived from the following formulas: qPiCb=Clip3(−QpBdOffsetC, 69, QpY_basic+pps_cb_qp_offset+slice_cb_qp_offset+delta_qp_c), and/or qPiCr=Clip3(−QpBdOffsetC, 69, QpY_basic+pps_cr_qp_offset+slice_cr_qp_offset+delta_qp_c); determining QP values for the current block in the chrominance component based on the qPiCb and qPiCr parameters or values.

In some embodiments, the method is applied to a Single CU and collocated block in the luminance component is equal to the current block.

For instance, the method is applied jointly for Luma and Chroma plane based on one PPS-signaled control flag (such as cu_qp_delta_enabled_flag); if the control flag (such as cu_qp_delta_enabled_flag) is equal to true, the method is applied for both luma and chroma QP derivation; or if the control flag (such as cu_qp_delta_enabled_flag) is equal to false, the method is not applied for both luma and chroma QP derivation.

In some embodiments, the method is applied separately for Luma and Chroma plane based on two PPS-based control flags (such as cu_qp_delta_enabled_flag_luma and cu_qp_delta_enabled_flag_chroma); if a first control flag (such as cu_qp_delta_enabled_flag_luma) is equal to true, the method is applied for luma QP derivation; or if the first control flag (such as cu_qp_delta_enabled_flag_luma) is equal to false, the method is not applied for luma QP derivation; and/or, if a second control flag (such as cu_qp_delta_enabled_flag_chroma) is equal to true, the method is applied for chroma QP derivation; or if the second control flag (such as cu_qp_delta_enabled_flag_chroma) is equal to false, the method is not applied for chroma QP derivation.

For example, the method further comprises: determining the QP value for the current block in the chrominance component based on a weighted sum of existing QP values of the one or more neighboring blocks of the collocated block in the luminance component.

Alternatively or in addition, the method further comprises: determining the QP value for the current block in the chrominance component based on a weighted sum of existing QP values of the one or more neighboring blocks of the current block in the chrominance component.

Alternatively or in addition, the method further comprises: determining the QP value for the current block in the chrominance component based on both the QP value of collocated block in the luminance component and a weighted sum of existing QP values of the one or more neighboring blocks of the current block in the chrominance component.

Alternatively or in addition, the method further comprises: determining the QP value for the current block in the chrominance component based on both a weighted sum of existing QP values of the neighboring blocks of the current block in the chrominance component and a weighted sum of existing QP values of the neighboring blocks of the collocated block in the luminance component.

In some embodiments, the method further comprises: determining the QP value for the current block in the chrominance component based on the one or more existing QP values and at least one of the following: a chrominance delta QP value signaled in the received bitstream, or a chrominance QP offset value signaled in the received bitstream.

In some embodiments, method further comprises: obtaining a partition depth value of the current block, and determining the QP value for the current block in the chrominance component based on the one or more existing QP values and a chrominance delta QP value signaled in the received bitstream, if the partition depth value is below a threshold.

For example, the threshold is determined based on a pre-defined number, or a number signaled in a parameter set.

For example, the luminance component and the chrominance component are partitioned into multiple blocks by a single partition tree, or the luminance component and the chrominance component are partitioned independently by separate partition trees.

In some embodiments, delta QP syntax elements (such as delta QP syntax elements representing the chrominance delta QP value, i.e. delta_qp_c) are signaled in the bitstream according to a following table:

```
transform_unit( x0, y0, tbWidth, tbHeight, treeType ) {        Descriptor
    if( treeType = = SINGLE_TREE){
        tu_cbf_luma[ x0 ][ y0 ]                                    ae(v)
        tu_cbf_cb[ x0 ][ y0 ]                                      ae(v)
        tu_cbf_cr[ x0 ][ y0 ]                                      ae(v)
        if( tu_cbf_luma[ x0 ][ y0 ] | | tu_cbf_cb[ x0 ][ y0 ] | |
          tu_cbf_cr[ x0 ][ y0 ] )
            delta_qp ( )
    }
    else{
        if (treeType = = DUAL_TREE_LUMA){
            tu_cbf_luma[ x0 ][ y0 ]                                ae(v)
            if( tu_cbf_luma[ x0 ][ y0 ] )
                delta_qp ( )
        }
        else /* DUAL_TREE_CROMA */{
            tu_cbf_cb[ x0 ][ y0 ]                                  ae(v)
            tu_cbf_cr[ x0 ][ y0 ]                                  ae(v)
        }
    }
...
}
```

In some embodiments, delta QP syntax elements (such as delta QP syntax elements representing the chrominance delta QP value, i.e. delta_qp_c) are signaled in the bitstream according to a following table:

```
transform_unit( x0, y0, tbWidth, tbHeight, treeType ) {        Descriptor
    if( treeType = = SINGLE_TREE){
        tu_cbf_luma[ x0 ][ y0 ]                                    ae(v)
        tu_cbf_cb[ x0 ][ y0 ]                                      ae(v)
        tu_cbf_cr[ x0 ][ y0 ]                                      ae(v)
        if( tu_cbf_luma[ x0 ][ y0 ] | | tu_cbf_cb[ x0 ][ y0 ] | |
          tu_cbf_cr[ x0 ][ y0 ] )
            delta_qp_y ( )
    }
    else{
        if (treeType = = DUAL_TREE_LUMA){
            tu_cbf_luma[ x0 ][ y0 ]                                ae(v)
            if( tu_cbf_luma[ x0 ][ y0 ])
                delta_qp_y ( )
        }
        else /* DUAL_TREE_CROMA */{
            tu_cbf_cb[ x0 ][ y0 ]                                  ae(v)
            tu_cbf_cr[ x0 ][ y0 ]                                  ae(v)
            if(tu_cbf_cb[ x0 ][ y0 ] | | tu_cbf_cr[ x0 ][ y0 ])
                delta_qp_c ( )
        }
    }
...
}
```

In some embodiments, delta QP syntax elements (such as delta QP syntax elements representing the chrominance delta QP value, i.e. delta_qp_c) are signaled in the bitstream according to a following table:

```
transform_unit( x0, y0, tbWidth, tbHeight, treeType ) {        Descriptor
    if( treeType = = SINGLE_TREE){
        tu_cbf_luma[ x0 ][ y0 ]                                    ae(v)
        if( tu_cbf_luma[ x0 ][ y0 ])
            delta_qp_y ( )
        tu_cbf_cb[ x0 ][ y0 ]                                      ae(v)
        tu_cbf_cr[ x0 ][ y0 ]                                      ae(v)
        if(tu_cbf_cb[ x0 ][ y0 ] | | tu_cbf_cr[ x0 ][ y0 ])
            delta_qp_c ( )
    }
    else{
        if (treeType = = DUAL_TREE_LUMA){
            tu_cbf_luma[ x0 ][ y0 ]                                ae(v)
            if( tu_cbf_luma[ x0 ][ y0 ] )
                delta_qp_y ( )
        }
        else /* DUAL_TREE_CROMA */{
            tu_cbf_cb[ x0 ][ y0 ]                                  ae(v)
            tu_cbf_cr[ x0 ][ y0 ]                                  ae(v)
            if(tu_cbf_cb[ x0 ][ y0 ] | | tu_cbf_cr[ x0 ][ y0 ])
                delta_qp_c ( )
        }
    }
...
}
```

In some embodiments, a decoding apparatus is provided comprising processing circuitry for carrying out any of the methods described previously.

In some embodiments, a computer program product comprising a program code for performing the method according to any of the methods described previously, when the computer program runs on a computing device.

In an embodiment, a decoding apparatus is provided for boundary partition of a current block of a picture, comprising: one or more processors; and a non-transitory computer-readable storage medium coupled to the processors and storing programming for execution by the processors, wherein the programming, when executed by the processors, configures the decoder to carry out any of the methods described previously.

In an embodiment, a computer readable storage medium is provided, recording a program for causing a computer to execute the method according to any of the methods described previously.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Logical Operators

The following logical operators are defined as follows:

| | |
|---|---|
| x && y | Boolean logical "and" of x and y |
| x \|\| y | Boolean logical "or" of x and y |
| ! | Boolean logical "not" |
| x ? y : z | If x is TRUE or not equal to 0, evaluates to the value of y; otherwise, evaluates to the value of z. |

Relational Operators

The following relational operators are defined as follows:

| | |
|---|---|
| > | Greater than |
| >= | Greater than or |
| < | Less than |
| <= | Less than or equal |
| == | Equal to |
| != | Not equal to |

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

| | |
|---|---|
| & | Bit-wise "and". When operating on integer arguments, operates on a two's complement representation of the integer value. When operating on a binary argument that contains fewer bits than another argument, the shorter argument is extended by adding more significant bits equal to 0. |
| \| | Bit-wise "or". When operating on integer arguments, operates on a two's complement representation of the integer value. When operating on a binary argument that contains fewer bits than another argument, the shorter argument is extended by adding more significant bits equal to 0. |
| ^ | Bit-wise "exclusive or". When operating on integer arguments, operates on a two's complement representation of the integer value. When operating on a binary argument that contains fewer bits than another argument, the shorter argument is extended by adding more significant bits equal to 0. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. Bits shifted into the least significant bits (LSBs) as a result of the left shift have a value equal to 0. |

Assignment Operators

The following arithmetic operators are defined as follows:

| | |
|---|---|
| = | Assignment operator |
| + + | Increment, i.e., x+ + is equivalent to x = x + 1; when used in an array index, evaluates to the value of the variable prior to the increment operation. |
| − − | Decrement, i.e., x− − is equivalent to x = x − 1; when used in an array index, evaluates to the value of the variable prior to the decrement operation. |
| += | Increment by amount specified, i.e., x += 3 is equivalent to x = x + 3, and x += (−3) is equivalent to x = x + (−3). |
| −= | Decrement by amount specified, i.e., x −= 3 is equivalent to x = x − 3, and x −= (−3) is equivalent to x = x − (−3). |

Range Notation

The following notation is used to specify a range of values:

x=y . . . z x takes on integer values starting from y to z, inclusive, with x, y, and z being integer numbers and z being greater than y.

What is claimed is:

1. A method for inverse quantization of a picture block, the method comprising:
   obtaining one or more existing quantization parameter (QP) values, wherein the one or more existing QP values are associated with a chrominance component of the picture block, wherein a colour format of the picture block is 4:4:4;
   determining a QP value for the chrominance component of the picture block based on the one or more existing QP values; and
   performing inverse quantization on the chrominance component of the picture block using the determined QP value;
   wherein the one or more existing QP values comprises a QP value for a luminance component of the picture block collocated with the chrominance component of the picture block, wherein the QP value for the luminance component is not a delta QP value;
   wherein determining the QP value for the chrominance component of the picture block based on the one or more existing QP values comprises:
   determining the QP value for the chrominance component of the picture block based on the QP value for the luminance component of the picture block collocated with the chrominance component of the picture block.

2. The method of claim 1, wherein determining the QP value for the chrominance component of the picture block based on the QP value for the luminance component of the picture block collocated with the chrominance component of the picture block comprises:
   retrieving a QP value of a luminance block collocated with a sample in a specific position in a chrominance block; and
   determining the QP value for the chrominance component of the picture block based on the retrieved QP value of the luminance block.

3. The method of claim 2, wherein the sample in the specific position is a top-left sample in a bottom right quarter of the chrominance block.

4. The method of claim 1, further comprising:
   determining the QP value for the chrominance component of the picture block based on the one or more existing QP values and at least one of the following:
   a chrominance delta QP value signaled in a bitstream, or
   a chrominance QP offset value signaled in a bitstream.

5. The method of claim 4, further comprising:
   obtaining a partition depth value of the picture block; and
   determining the QP value for the chrominance component of the picture block based on the one or more existing QP values and the chrominance delta QP value signaled in the bitstream, if the partition depth value is below a threshold.

6. The method of claim 4, wherein the threshold is determined based on a pre-defined number, or a number signaled in a parameter set.

7. The method of claim 1, wherein
   the luminance component of the picture block and the chrominance component of the picture block are partitioned independently by separate partition trees.

8. A decoding apparatus comprising:
   one or more processors; and
   a computer-readable storage medium coupled to the processors and storing programming instructions, which when executed by the processors, cause the decoding apparatus to:
   obtain one or more existing quantization parameter (QP) values, wherein the one or more existing QP values are associated with a chrominance component of a picture block, wherein a colour format of the picture block is 4:4:4;
   determine a QP value for the chrominance component of the picture block based on the one or more existing QP values; and
   perform inverse quantization on the chrominance component of the picture block using the determined QP value;
   wherein the one or more existing QP values comprises a QP value for a luminance component of the picture block collocated with the chrominance component of the picture block, wherein the QP value for the luminance component is not a delta QP value;
   wherein determining the QP value for the chrominance component of the picture block based on the one or more existing QP values comprises:
   determining the QP value for the chrominance component of the picture block based on the QP value for the luminance component of the picture block collocated with the chrominance component of the picture block.

9. The decoding apparatus of claim 8, wherein determining the QP value for the chrominance component of the picture block based on the QP value for the luminance component of the picture block collocated with the chrominance component of the picture block comprises:
   retrieving a QP value of a luminance block collocated with a sample in a specific position in a chrominance block; and
   determining the QP value for the chrominance component of the picture block based on the retrieved QP value of the luminance block.

10. The decoding apparatus of claim 9, wherein the sample in the specific position is a top-left sample in a bottom right quarter of the chrominance block.

11. A non-transitory storage medium storing an encoded bitstream for video signals, that when decoded by a decoding device comprising a processor, is used by the decoding device to generate a video, the encoded bitstream comprising one or more existing quantization parameter (QP) values, wherein the one or more existing QP values are associated with a chrominance component of a picture block, wherein a colour format of the picture block is 4:4:4;
   wherein the one or more existing QP values are used for determining a QP value for the chrominance component of the picture block; and
   wherein the determined QP value is used for performing inverse quantization on the chrominance component of the picture block;
   wherein the one or more existing QP values comprises a QP value for a luminance component of the picture block collocated with the chrominance component of the picture block, wherein the QP value for the luminance component is not a delta QP value;
   wherein the QP value for the chrominance component of the picture block is determined by determining the QP value for the chrominance component of the picture block based on the QP value for the luminance component of the picture block collocated with the chrominance component of the picture block.

12. The non-transitory storage medium of claim 11, wherein the QP value for the chrominance component of the picture block is determined by retrieving a QP value of a luminance block collocated with a sample in a specific position in a chrominance block; and determining the QP value for the chrominance component of the picture block based on the retrieved QP value of the luminance block.

13. The non-transitory storage medium of claim 12, wherein the sample in the specific position is a top-left sample in a bottom right quarter of the chrominance block.

14. The non-transitory storage medium of claim 11, wherein the luminance component of the picture block and the chrominance component of the picture block are partitioned independently by separate partition trees.

* * * * *